US012689908B2

(12) United States Patent
Muhammad et al.

(10) Patent No.: US 12,689,908 B2
(45) Date of Patent: Jul. 21, 2026

(54) RADIO NETWORK RESOURCE SHARING BASED ON A DISTRIBUTED LEDGER

(71) Applicant: Telefonaktiebolaget LM Ericsson (publ), Stockholm (SE)

(72) Inventors: Ajmal Muhammad, Sollentuna (SE); Rafia Inam, Västerås (SE); Athanasios Karapantelakis, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 546 days.

(21) Appl. No.: 17/998,502

(22) PCT Filed: May 13, 2020

(86) PCT No.: PCT/EP2020/063336
§ 371 (c)(1),
(2) Date: Nov. 11, 2022

(87) PCT Pub. No.: WO2021/228383
PCT Pub. Date: Nov. 18, 2021

(65) Prior Publication Data
US 2023/0189010 A1 Jun. 15, 2023

(51) Int. Cl.
*H04W 16/14* (2009.01)
(52) U.S. Cl.
CPC .................................. *H04W 16/14* (2013.01)
(58) Field of Classification Search
CPC ...... H04W 16/14; H04W 12/00; H04L 63/12; H04L 9/50; H04L 9/3239
See application file for complete search history.

(56) References Cited

U.S. PATENT DOCUMENTS

| | | | |
|---|---|---|---|
| 11,128,437 B1 * | 9/2021 | Nossik | H04L 9/0637 |
| 2020/0029250 A1 * | 1/2020 | Ibek | H04L 41/0894 |
| 2020/0097961 A1 * | 3/2020 | Luo | G06Q 20/123 |

FOREIGN PATENT DOCUMENTS

WO WO-2020040680 A1 * 2/2020 ............ H04W 16/14

OTHER PUBLICATIONS

Hao Xu et al., "Blockchain-enabled Resource Management and Sharing for 6G Communications," arXiv:2003.13083v2. Apr. 11, 2020. (Year: 2020).*
International Search Report and Written Opinion for Application No. PCT/EP2020/063336, Jan. 27, 2021, 9 pages.

(Continued)

*Primary Examiner* — Marcus Hammonds
(74) *Attorney, Agent, or Firm* — Nicholson De Vos Webster & Elliott LLP

(57) ABSTRACT

A method and system for sharing radio network resources in a distributed ledger (DL) network that is operated between a plurality of participants including a first participant and a second participant. A DL node of the second participant determines from a distributed ledger of the DL network a smart contract that allows sharing of radio network resources owned by the first participant; executes the smart contract to generate one or more transactions between the first participant and the second participant, where a first transaction of the transactions indicates that a first portion of the radio network resources of the first participant is shared with the second participant; and records, through a consensus mechanism, the transactions in the distributed ledger.

12 Claims, 12 Drawing Sheets

(56) References Cited

OTHER PUBLICATIONS

ETSI TS 132 130 V14.1.0, Universal Mobile Telecommunications System (UMTS); LTE; Telecommunication management; Network sharing; Concepts and requirements (3GPP TS 32.130 version 14.1.0 Release 14), Jan. 2018, 18 pages, ETSI.

Petar Popovski et al., "5G Wireless Network Slicing for eMBB, URLLC, and mMTC: A Communication-Theoretic View," 2018, 15 pages, vol. 6, IEEE.

Ferry Grijpink et al., "Network sharing and 5G: A turning point for lone riders," Feb. 23, 2018, 5 pages, McKinsey & Company, downloaded from https://www.mckinsey.com/industries/technology-media-and-telecommunications/our-insights/network-sharing-and-5g-a-turning-point-for-lone-riders on May 13, 2020.

3GPP TR 38.889 V16.0.0, "3rd Generation Partnership Project; Technical Specification Group Radio Access Network; Study on NR-based access to unlicensed spectrum (Release 16)," Dec. 2018, 119 pages, 3GPP Organizational Partners.

3GPP TS 23.501 V16.4.0, "3rd Generation Partnership Project; Technical Specification Group Services and System Aspects; System architecture for the 5G System (5GS); Stage 2 (Release 16)," Mar. 2020, 430 pages, 3GPP Organizational Partners.

3GPP TS 22.101 V17.1.0, "3rd Generation Partnership Project; Technical Specification Group Services and System Aspects; Service aspects; Service principles (Release 17)," Dec. 2019, 103 pages, 3GPP Organizational Partners.

3GPP TS 22.261 V17.2.0, "3rd Generation Partnership Project; Technical Specification Group Services and System Aspects; Service requirements for the 5G system; Stage 1 (Release 17)," Mar. 2020, 83 pages, 3GPP Organizational Partners.

Hao Xu et al., "Blockchain-enabled resource management and sharing for 6G communications," 2020, pp. 261-269, Digital Communications and Networks 6, Chongqing University of Posts and Telecommunications.

* cited by examiner

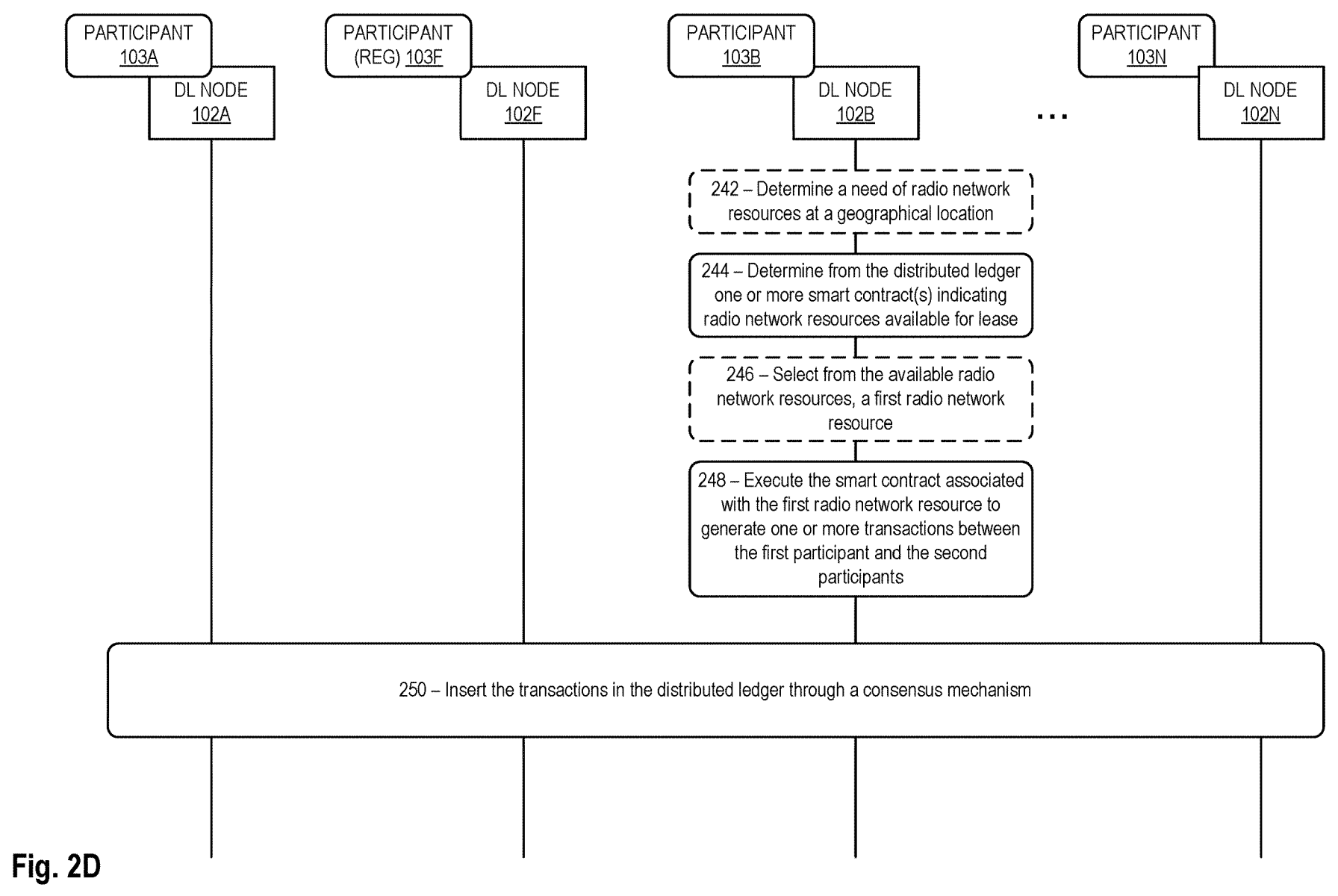

PARTICIPANT 103A

DL NODE 102A

PARTICIPANT (REG) 103F

DL NODE 102F

PARTICIPANT 103B

DL NODE 102B

PARTICIPANT 103N

DL NODE 102N

242 – Determine a need of radio network resources at a geographical location

244 – Determine from the distributed ledger one or more smart contract(s) indicating radio network resources available for lease 246 – Select from the available radio network resources, a first radio network resource 248 – Execute the smart contract associated with the first radio network resource to generate one or more transactions between the first participant and the second participants 250 – Insert the transactions in the distributed ledger through a consensus mechanism

Fig. 2D

GENERATE A SMART CONTRACT THAT ALLOWS SHARING OF RADIO NETWORK RESOURCES
302

VALIDATE SMART CONTRACT
304A

INSERT THE SMART CONTRACT IN A DISTRIBUTED LEDGER OF THE DISTRIBUTED LEDGER NETWORK
306

VALIDATE SMART CONTRACT
304B

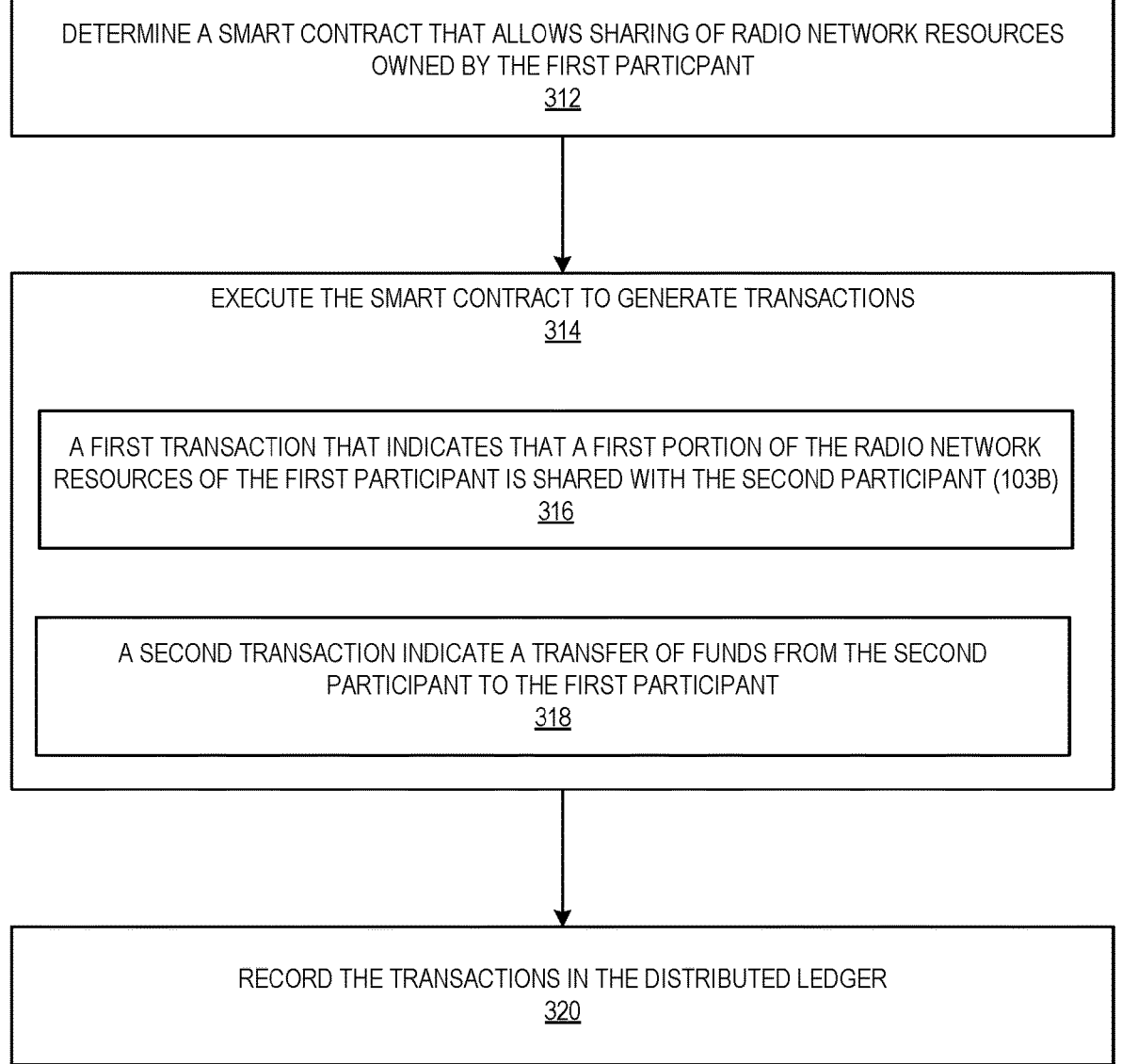

DETERMINE A SMART CONTRACT THAT ALLOWS SHARING OF RADIO NETWORK RESOURCES OWNED BY THE FIRST PARTICPANT
312

EXECUTE THE SMART CONTRACT TO GENERATE TRANSACTIONS
314

A FIRST TRANSACTION THAT INDICATES THAT A FIRST PORTION OF THE RADIO NETWORK RESOURCES OF THE FIRST PARTICIPANT IS SHARED WITH THE SECOND PARTICIPANT (103B)
316

A SECOND TRANSACTION INDICATE A TRANSFER OF FUNDS FROM THE SECOND PARTICIPANT TO THE FIRST PARTICIPANT
318

RECORD THE TRANSACTIONS IN THE DISTRIBUTED LEDGER
320

Fig. 3B

Figure 4:
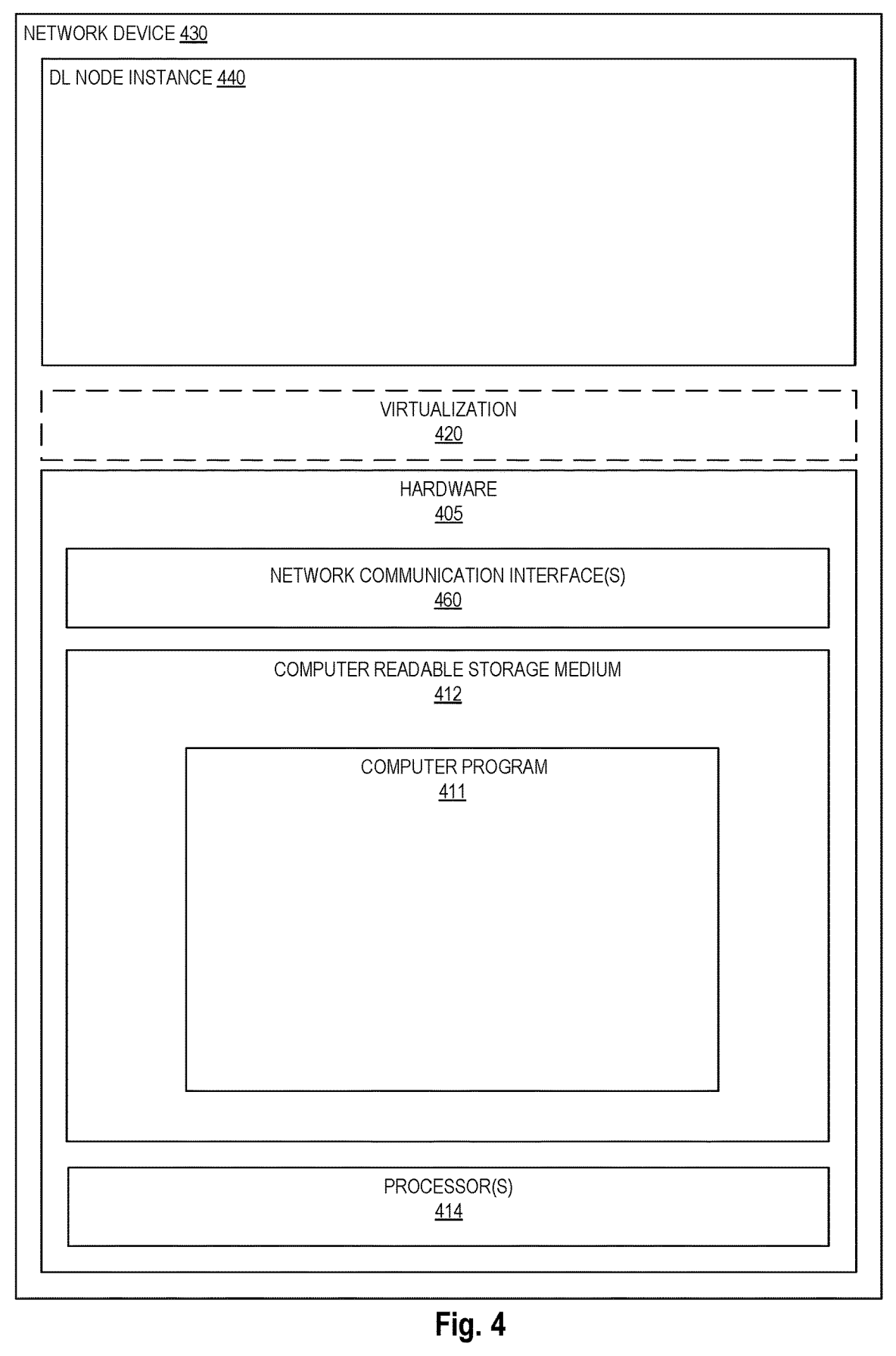

NETWORK DEVICE <u>430</u>

DL NODE INSTANCE <u>440</u>

VIRTUALIZATION
<u>420</u>

HARDWARE
<u>405</u>

NETWORK COMMUNICATION INTERFACE(S)
<u>460</u>

COMPUTER READABLE STORAGE MEDIUM
<u>412</u>

COMPUTER PROGRAM
<u>411</u>

PROCESSOR(S)
<u>414</u>

Figure 5:
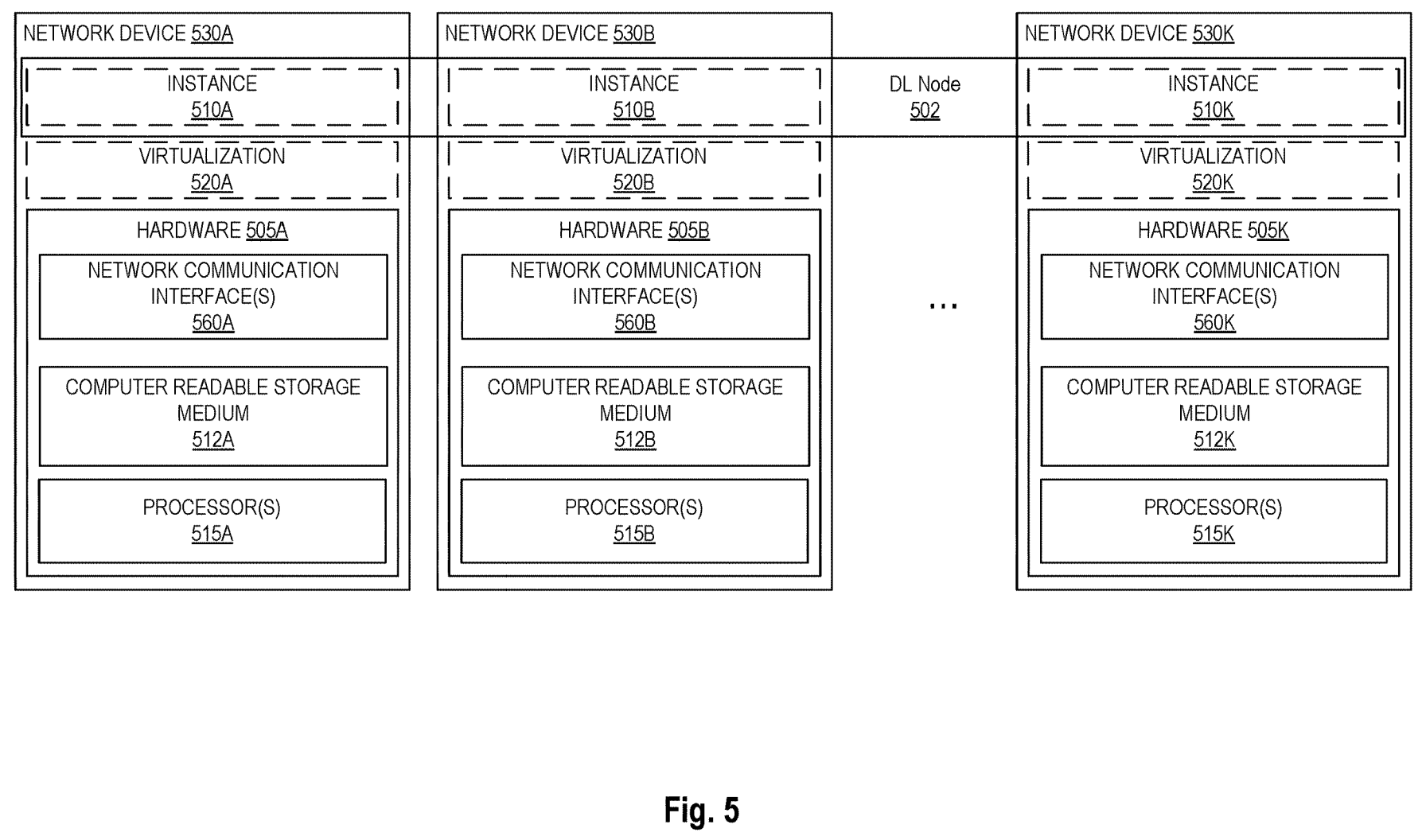

NETWORK DEVICE 530A

INSTANCE 510A

VIRTUALIZATION 520A

HARDWARE 505A

NETWORK COMMUNICATION INTERFACE(S) 560A

COMPUTER READABLE STORAGE MEDIUM 512A

PROCESSOR(S) 515A

NETWORK DEVICE 530B

INSTANCE 510B

VIRTUALIZATION 520B

HARDWARE 505B

NETWORK COMMUNICATION INTERFACE(S) 560B

COMPUTER READABLE STORAGE MEDIUM 512B

PROCESSOR(S) 515B

DL Node 502

NETWORK DEVICE 530K

INSTANCE 510K

VIRTUALIZATION 520K

HARDWARE 505K

NETWORK COMMUNICATION INTERFACE(S) 560K

COMPUTER READABLE STORAGE MEDIUM 512K

PROCESSOR(S) 515K

RADIO NETWORK RESOURCE SHARING BASED ON A DISTRIBUTED LEDGER

CROSS-REFERENCE TO RELATED APPLICATIONS

This application is a National stage of International Application No. PCT/EP2020/063336, filed May 13, 2020, which is hereby incorporated by reference.

TECHNICAL FIELD

The present disclosure relates to the field of communication networks; and more specifically, to sharing radio network resources in a distributed ledger network.

BACKGROUND

Mobile networks operate in specific parts of the electromagnetic spectrum. The electromagnetic spectrum is made of spectrum bands that are designated by a regulatory authority to be reserved for organizations that have been granted licenses, and of unlicensed spectrum bands that are not available for licensing. Mobile network operators (such as Public Landline Mobile Operators (PLMNs)), who own the mobile networks, lease spectrum bands from each country's regulator. While several mechanisms, such as Dynamic Spectrum Management (DSM) techniques (e.g., dynamic channel allocation (DCA), link adaptation and multi-user multiple input multiple output (MIMO)) have been developed to enable the efficient usage of the licensed spectrum resources by the mobile networks, these techniques work within the administrative domain of a single mobile network operator and do not allow multiple mobile network operators to share radio access network resources. In addition, the telecom industry has shifted attention towards the unlicensed bands of the electromagnetic spectrum to allow the deployment of supplementary uplink/downlink carriers or standalone systems. Various approaches to mobile operation in the unlicensed spectrum have been considered. These approaches include the Long-Term Evolution Unlicensed (LTE-U), the Long-Term Evolution-based license-assisted access (LTE-LAA), and the standalone operation of LTE in the unlicensed spectrum. 3rd Generation Partnership Project (3GPP) has expanded 5G New Radio into the unlicensed 5 GHz and 6 GHz bands in 3GPP Release 16 (3GPP TR 38.889 version 16.0.0), namely NR-U. However, operation in an unlicensed spectrum is subject to various limitations and restrictions including interference between different co-channel systems.

Several approaches have been initiated to drive down the cost of mobile network infrastructure including network sharing. A network sharing architecture allows multiple participating mobile network operators to share resources of a single shared network according to agreed allocation terms. To share network resources, a mobile network operator would allocate shared resources of a network to one or more participating operators based on respective plans, needs, and service-level agreements (SLAs). A user equipment (UE) that has a subscription to a participating mobile network operator would be able to select the mobile network operator while within the coverage area of the shared network to receive subscribed services from the participating network operator. 3GPP (for example TS 32.130, version 14.1.0) laid out two approaches for enabling the sharing of a Radio Access Network (RAN). In a first approach, 3GPP considers a multi-operator core network (MOCN) approach, where each one of multiple network operators has its own core network while sharing the RAN. MOCN is an expensive solution as each network operator needs to own infrastructure for implementing the Mobility Management Entity (MME) of the core network, however MOCN is a simpler solution as there is no need for multiple MME interfaces and is more flexible/customizable than alternative solutions such as gateway core network (GWCN), as each network operator can make decision by its own mobility management. In a second approach, 3GPP considers a GWCN solution approach, where the multiple network operators share, in addition to the RAN, the mobility management entity of the core network (Mobility Management Entity—MME in LTE and Access and Mobility Management Function—AMF in 5G), which is responsible for connection management between the mobile terminal and the network. The GWCN approach enables additional cost savings compared to the MOCN approach, but it is relatively less flexible, potentially reducing the level of differentiation among the participating operators. As network sharing becomes a central feature of mobile network operation, there is a need to address a wide variety of technical, commercial, and regulatory needs.

SUMMARY

One general aspect includes a method for sharing radio network resources in a distributed ledger (DL) network that is operated between a plurality of participants including a first participant and a second participant, the method performed by a DL node including: determining, at the DL node of the second participant, from a distributed ledger of the DL network a smart contract that allows sharing of radio network resources owned by the first participant; executing the smart contract to generate one or more transactions between the first participant and the second participant, where a first transaction of the transactions indicates that a first portion of the radio network resources of the first participant is shared with the second participant; and recording, through a consensus mechanism, the transactions in the distributed ledger.

One general aspect includes a computer program comprising instructions which, when executed by at least one processor of a DL node causes the DL node to perform a method including: determining, at the DL node of the second participant, from a distributed ledger of the DL network a smart contract that allows sharing of radio network resources owned by the first participant; executing the smart contract to generate one or more transactions between the first participant and the second participant, where a first transaction of the transactions indicates that a first portion of the radio network resources of the first participant is shared with the second participant; and recording, through a consensus mechanism, the transactions in the distributed ledger.

One general aspect includes a computer program product including a computer readable storage medium storing a computer program comprising instructions which, when executed by at least one processor of a DL node causes the DL node to perform a method including: determining, at the DL node of the second participant, from a distributed ledger of the DL network a smart contract that allows sharing of radio network resources owned by the first participant; executing the smart contract to generate one or more transactions between the first participant and the second participant, where a first transaction of the transactions indicates that a first portion of the radio network resources of the first participant is shared with the second participant; and recording, through a consensus mechanism, the transactions in the distributed ledger.

One general aspect includes a carrier containing a computer program comprising instructions which, when executed by at least one processor of a DL node causes the DL node to perform a method including: determining, at the DL node of the second participant, from a distributed ledger of the DL network a smart contract that allows sharing of radio network resources owned by the first participant; executing the smart contract to generate one or more transactions between the first participant and the second participant, where a first transaction of the transactions indicates that a first portion of the radio network resources of the first participant is shared with the second participant; and recording, through a consensus mechanism, the transactions in the distributed ledger.

One general aspect includes a distributed ledger (DL) node for sharing radio network resources in a DL network that is operated between a plurality of participants including a first participant and a second participant, the DL node including: one or more processors; and a computer readable storage medium storing a set of computer readable instructions that when executed by the one or more processors cause the DL node of the second participant to perform operations including: determining from a distributed ledger of the DL network a smart contract that allows sharing of radio network resources owned by the first participant; executing the smart contract to generate one or more transactions between the first participant and the second participant, where a first transaction of the transactions indicates that a first portion of the radio network resources of the first participant is shared with the second participant; and recording, through a consensus mechanism, the transactions in the distributed ledger.

BRIEF DESCRIPTION OF THE DRAWINGS

The present disclosure may best be understood by referring to the following description and accompanying drawings that are used to illustrate embodiments of the present disclosure. In the drawings:

FIG. 2D illustrates a block diagram of exemplary operations that can be performed for leasing radio network resources from a participant in the DL network, in accordance with some embodiments.

FIG. 3B illustrates a flow diagram of exemplary operations that can be performed for sharing radio network resources from a participant to another participant, in accordance with some embodiments.

FIG. 4 illustrates a block diagram for a network device that can be used for implementing a DL node described herein, in accordance with some embodiments.

FIG. 5 illustrates a block diagram for network devices that can be used for implementing a DL node described herein, in accordance with some embodiments.

DETAILED DESCRIPTION

Figure 1A:
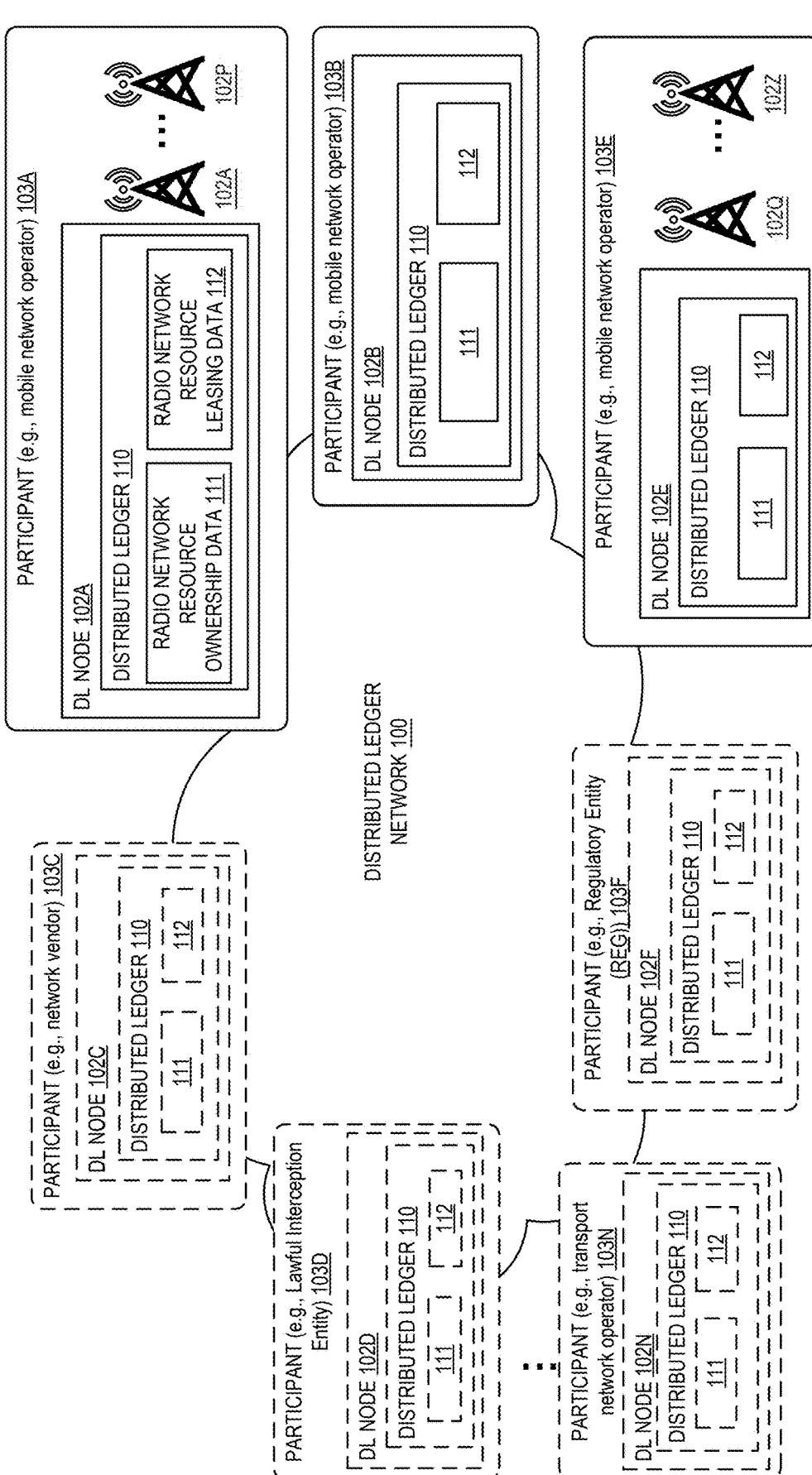
FIG. 1A illustrates a block diagram of an exemplary distributed ledger (DL) network for sharing ownership and usage of network resources between multiple participants, in accordance with some embodiments.

The following description describes methods and system for sharing radio network resources in a distributed ledger (DL) network (100). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the embodiments may be practiced without such specific details. In other instances, control structures, gate level circuits and full software instruction sequences have not been shown in detail in order not to obscure the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to some embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Current mechanisms deployed for enabling multiple mobile network operators to share radio access resources are inadequate and have several drawbacks. Current resource sharing mechanisms in mobile networks are static. For example, in existing RAN sharing solutions a hosting RAN mobile network operator that own RAN resources allocates static/pre-defined portions of the resources (e.g., specific cells/sectors) to each one of other mobile network operator for a specified time period based on an agreement/contract between the hosting and tenant mobile network operators. The shared RAN resource employs the first UE come first UE served allocation mechanism for the assignment of radio resources to UEs belonging to the tenant mobile network operators. However, considering the rapidly changing technology landscape, the proliferation of new services and the dynamic nature of customers' behavior are making it difficult to achieve a satisfactory level of trade-off between cost and quality of experience (QoE) for users/customers via the static allocation solution. This is especially true for use cases that have guaranteed bitrate and low latency requirements from mobile networks.

In case of unlicensed spectrum bands, both the Institute of Electrical and Electronics Engineers (IEEE) and 3GPP have provided mechanisms for minimizing interference between systems and nodes. Still interference avoidance cannot be guaranteed, especially when the number of nodes exceeds a certain value. With unlicensed spectrum, there is no process for establishing the right of use, however, sharing information across multiple PLMNs about the unlicensed carriers/channels usage can mitigate the interference issue and efficient utilization of the unlicensed spectrum bands. Existing network resource sharing mechanisms do not allow such sharing of information and therefore do not guarantee interference avoidance for unlicensed spectrum bands.

The embodiments described herein present a collaborative and trusted platform that allows mobile network operators to invest and/or use RAN resources dynamically based on spatio-temporal demand. This collaborative platform leads to a reduction in the total cost of new services to end-users while maintaining the same levels of QoE. In the embodiments herein a system and a method are presented to allow mobile network operators to jointly build/invest, use, and maintain. RAN or cells for their operations and/or temporarily lease their part of RAN resources including spectrum resources (both licensed and unlicensed) to other mobile network operators when they do not need them.

In the embodiments described herein records indicating which network operator owns what portion of RAN resources in a cell/site and/or which portion of the RAN resources is leased to another network operator are recorded in a distributed ledger of a distributed ledger network. A method in a distributed ledger (DL) network that is operated between a plurality of participants including a first participant and a second participant is described. The method includes determining, at a DL node of the second participant, from a distributed ledger of the DL network a smart contract that allows sharing of radio network resources owned by the first participant; executing the smart contract to generate one or more transactions between the first participant and the second participant, where a first transaction of the transactions indicates that a first portion of the radio network resources of the first participant is shared with the second participant; and recording, through a consensus mechanism, the transactions in the distributed ledger.

The immutability and replicability of the distributed ledger enables the establishment of audit trails and detection of potential violation of contract among co-owners and/or the tenants of the radio network resources. Further, in addition to enabling radio access network sharing, the proposed system and method enable the transport resource sharing, which is needed to connect the radio access network to a core network.

The embodiments described herein provide several advantages when compared with existing network resource sharing mechanisms. The embodiments provide a trusted and cooperative platform to mobile network operators for joint investment, deployment, and usage of radio network resources. The embodiments allow for the development of new revenue channels for mobile network operators through temporal lease of RAN resources. They also open new business opportunities, where a third party can lease spectrum resources from Spectrum Regularity Authority and then provide a dynamic "Spectrum-as-a-service" to mobile network operators without the need for investment in the network infrastructure. The embodiments described herein open new business opportunities to third parties by investing either in radio network infrastructure or leasing spectrum resources from Spectrum Regularity Authority and providing "RAN-as-a-service" or "Spectrum-as-a-service" to mobile network operator that don't own network infrastructure or lease spectrum bands. The embodiments described herein further allow for new revenue channels for transport network providers via leasing network resources to the mobile network operators for connectivity between the radio network and a core network. The embodiments herein allow mobile network operators to reduce the operating expenses by leasing RAN and transport resources per need without over-provisioning or over-dimensioning and enable faster deployments of new services by reducing the cost of deployment via shared pooling among the mobile network operators. The embodiments described herein further enable a more efficient usage of the unlicensed spectrum bands in an area between co-located nodes (belonging to different mobile network operators) by keeping track of the channels used by these cells, which ensures that no two or more co-located cells use the same unlicensed channels at the same time. The cost savings potential for network sharing is even greater in 5G networks. In fact, the initial deployment of 5G networks is likely to require large investments on the part of mobile network operators. As 5G networks rely on significantly higher frequency spectrum bands to support provision of higher throughput, a greater number of connected devices per cell, and an increased data capacity requirements. Due to the physical propagation characteristics of these high-frequency wavelengths (i.e., short wavelength and cannot penetrate though certain material such as concrete), the signal cannot propagate far before it deteriorates, thus, a much larger number of base stations or cell sites is needed for the deployment of 5G networks than the one needed for 4G networks. The embodiments described herein enable mobile network operators to collectively invest in the deployment of network infrastructure for 5G networks and/or efficiently lease these resources once the networks are deployed.

Overview:

Distributed ledger technology (DL) networks are platforms used for building, running, and deploying a decentralized and distributed ledger. In a DL network a distributed ledger (which is also referred to as a digital ledger) permanently records digital records of transactions that occur between two participants. The records cannot be altered retroactively without the alteration of all subsequent transactions in the distributed ledger and without consensus from multiple nodes in the DL network. Recordation of transactions in the distributed ledger allows the participants to verify and audit transactions inexpensively and securely. A distributed ledger is maintained without a central authority or implementation. In a DL network the data can be spread across multiple organizations, potentially in different countries, under different legislations, with different level of technical expertise.

DL networks may be public (which can also be referred to as permissionless) or private (which can also be referred to as permissioned). Public DL networks are available to anyone who wants to join and use the network. In this type of DL network, anyone is allowed to read, write, or join the public DL network. In public DL networks, anyone, anywhere, can use the DL network to input transactions and data. While private DL networks can be similar to public DL networks in certain aspects, they have access controls that restrict those that can join the network. Private DL networks have one or multiple entities that control access to the network.

Multiple participants (e.g., organizations, enterprises, individuals, etc.) can set up a private DL network to protect the privacy and security of their data. In some embodiments, participation in a private DL network can be initiated through an invitation. The participant in the private DL network can be validated by a node that starts the DL network (which can be referred to as a network starter) or by multiple nodes in the network. Thus, participation authorization can be set up by a single participant of the DL network, a regulatory authority, or a consortium of participants. In addition to restricting access to participants, a private DL network can also restrict participants' activities such that some transactions can only be carried out by some participants and not by other participants consequently creating an additional layer of privacy.

FIG. 1A illustrates a block diagram of an exemplary DL network 100 for sharing ownership and usage of network resources between multiple participants, in accordance with some embodiments. In some embodiments, the DL network 100 is a permissioned distributed ledger network. In the following description some examples will be described for a particular type of DL networks, namely the blockchain networks. However, the embodiments described herein generally apply to other types of DL networks, which will not necessarily be named herein. The DL network 100 implements a distributed ledger 110. The distributed ledger 110 of the DL network 100 has a multi-layer structure and stores information about the ownership of the radio network resources, radio network resources ownership data 111, as well as the current utilization and availability of the radio network resources for lease, radio network resources leasing data 112. While embodiments herein will be described with respect to the distributed ledger including both radio network resources ownership data 111 and radio network resources leasing data 112, in other embodiments, the distributed ledger 110 may include one or the other of the radio network resources ownership data 111 and the radio network resources leasing data 112.

A participant in the DL network 100 is an entity that can participate and contribute to transactions with other participants in the DL network. Each participant owns and/or operates a network of nodes (not illustrated) that are used to access and participate in the DL network 100. The nodes of a participant can be distributed across multiple geographical locations. The nodes of a participant may include DL nodes or simple processing nodes that are not part of the DL network 100. The processing nodes can implement one or more functionalities of a telecommunication network (e.g., radio access node such as evolved Node B base stations (eNodeBs), Evolved Universal Terrestrial Radio Access (E-UTRA), and/or core network nodes such as Mobility Management Entity (MME), Serving Gateway (S-GW), Packet Data Gateway (P-GW), Policy and Charging Enforcement Function (PCEF), Policy and Charging Rules Function (PCRF), Home Subscriber Server (HSS) in LTE, etc.). In a non-limiting example, the DL network 100 includes multiple participants 103A-N. The various components of the DL network 100 communicate through a physical network (supported by wired, wireless, or a combination of wired and wireless networking technology). As it will be described below, each node of a participant can be implemented over one or more network devices that enable the multiple nodes to communicate through the physical network.

A DL node is a node that is operative to perform some, or all operations related to updating and maintaining the distributed ledger 110. For example, a DL node can be a full node that stores the entire distributed ledger 110 of the DL network 100. Alternatively, the DL node can be a light node, which may include only a portion of the distributed ledger 110. The DL node may further be operative to receive transactions from nodes of participants, evaluate the transactions, and validates them to be added to the distributed ledger 110 based on a consensus algorithm (such as Proof of Work (PoW), Proof of Stake (PoS), or other). Thus, the DL node is operative to synchronize the state of the distributed ledger 110, as well as receive requests from users to alter the state (receive, evaluate, and validate transactions). A DL node can be referred to as a peer node or peer in the DL network 100. The DL node may include an entire copy or a partial copy of the distributed ledger 110.

In the following description the radio network resources will refer to the radio access network resources, the transport network resources, or a combination of the radio access network resources and the transport network resources. The radio access network is part of a mobile telecommunication system and implements the radio access technology. The radio access network resides between a device such as a user equipment (e.g., mobile phone, computer, etc.) and a remotely controlled electronic device to provide a connection with a core network of the mobile telecommunication system. In certain embodiments, the RAN includes one or more network devices that include radio access features that provide wireless radio network access to other electronic devices (for example a "radio access network device" may refer to such a network device) such as user equipment devices (UEs). For example, the network device of a RAN may be a base station, such as eNodeB in Long Term Evolution (LTE), NodeB in Wideband Code Division Multiple Access (WCDMA) or other types of base stations, as well as a Radio Network Controller (RNC), a Base Station Controller (BSC), or other types of control nodes. The RAN resources, which may include the base stations 102A-P and 102Q-N, support RAN sharing functionality, e.g., through RAN slicing. Network slicing allows a mobile network operator to provide dedicated logical networks with customer specific functionality, with the benefit of the economies of scale of a common infrastructure. It allows mobile services to be abstracted from the network resources. A network slice is a separate logical mobile network which delivers a set of services with similar characteristics and is isolated from other network slices. In some embodiments, the RAN resources are operative to enable one or more UEs to access multiple services through multiple RAN slices. The transport network infrastructure may include one or more network devices that are coupled with the RAN resources and provide connectivity between the RAN resources and a core network of a mobile network operator.

In some embodiments, a participant of the DL network 100 can be an owner of radio network resources that include RAN resources (e.g., base stations or other radio access points) and/or a transport network resources. In some embodiments, two different participants can correspond to two different administrative domains. A participant may be a mobile network operator. In some embodiments, the mobile network operator owns radio network resources. In other embodiments, the mobile network operator owns the transport network resources. In another embodiment, the mobile network operator may own both radio network resources and transport resources. In some embodiments, in addition to the radio network resources, the mobile network operator may further own computing resources (e.g., data centers, servers, etc.) that implement components of a core network. Thus, the RAN resources, the transport network infrastructure, and the infrastructure that implements the core network can be owned by the same administrative entity (the mobile network operator) or by two different administrative entities. A mobile network operator can be a standard public landline mobile network (PLMN) operator offering radio access to mobile devices. In some embodiments, the mobile network operator may offer radio access services to customers as well as core network services that rely on core network resources (e.g., data centers, servers, etc.). In other embodiments, the mobile network operator may offer only radio access services and is operative to collaborate with other service providers for the core network services. In some embodiments, the DL network 100 includes multiple mobile network operators as participants.

In some embodiments, a participant of the DL network 100 can be an entity that needs to access/lease the network resources from one or more owner of the radio network resources that participate in the DL network 100. In some embodiments, the participant can be a network service vendor that does not own the hardware infrastructure and needs to lease this infrastructure from one or more participants in the DL network 100 to provide one or more network services to customers. In some embodiments, the participant of the DL network 100 can own a portion of the network resources but may need to lease additional network resources for a given period of time from one or other participants in the DL network 100.

In some embodiments, a participant may be a lawful interception entity, such as a military, police or emergency response authority, that can request leasable network resources, such as a RAN slice for a specific duration. In some embodiments, the request for these network resources may override all requests by mobile network operators during that duration for example, in the case of an emergency, a public security threat and/or safety measure related to the request.

In some embodiments, a participant can be a regulatory entity (REG). In some embodiments, the REG provides the DL information about other participants in the DL network. For example, the REG may provide information regarding mobile network operators that participate in the DL network 100, e.g., whether a mobile network operator can do business in a particular region, etc. In some embodiments, REG has oversight in all RAN sharing (including spectrum allocation) done between the mobile network operators and optionally over the lawful interception entity. In some embodiments, the REG can make sure that no two entities use the same carriers/channels in their co-located cells for the unlicensed bands of the spectrum.

The DL network 100 is operative to enable participants to share network resources, in particular radio network resources. In some embodiments, the system 100 enables the participants to collaboratively invest in building and/or deploying radio access networks (e.g., sites, cells infrastructure) and record this investment and ownership in the distributed ledger 110 of the DL network 100. In some embodiments, the DL network 100 further enables the participants to lease the network resources, in particular the radio access network resources from the owners of these resources through the DL network 100. In these embodiments, the availability of the network resources is recorded in the distributed ledger as well as the leases contracted between participants for the use of the resources.

The operations in the block diagrams of FIGS. 2A-D will be described with reference to the exemplary embodiments of FIGS. 1A-C. However, it should be understood that the operations of the block diagrams of FIGS. 2A-D can be performed by embodiments of the invention other than those discussed with reference to FIGS. 1A-C, and the embodiments of the invention discussed with reference to FIGS. 1A-C can perform operations different than those discussed with reference to the block diagrams of FIGS. 2A-D.

Sharing Ownership of Radio Access Resources:

The embodiments herein will be described with respect to a DL node 102A of a participant 103A that is an owner of a radio network resources and the DL node 102B of the participant 103B that is a mobile network operator that is interested in investing in a portion of the radio network resources owned by the participant 103A. In this example, the radio network of the participant 103A includes the base stations 102A-P. In other examples, the radio network may include more or less base stations. In other examples, the radio network resources of the participant may include additionally or alternatively to the base stations a transport network that connects base stations to a core network. Thus, in these embodiments, the participant 103A is a mobile network operator that is interested in providing radio access services in a particular area. For example, the participant 103A can be interested in installing radio access sites based on a new technology such as 5G or by upgrading existing sites from a previously deployed technology (e.g., upgrading from 4G to 5G).

Figure 2A:
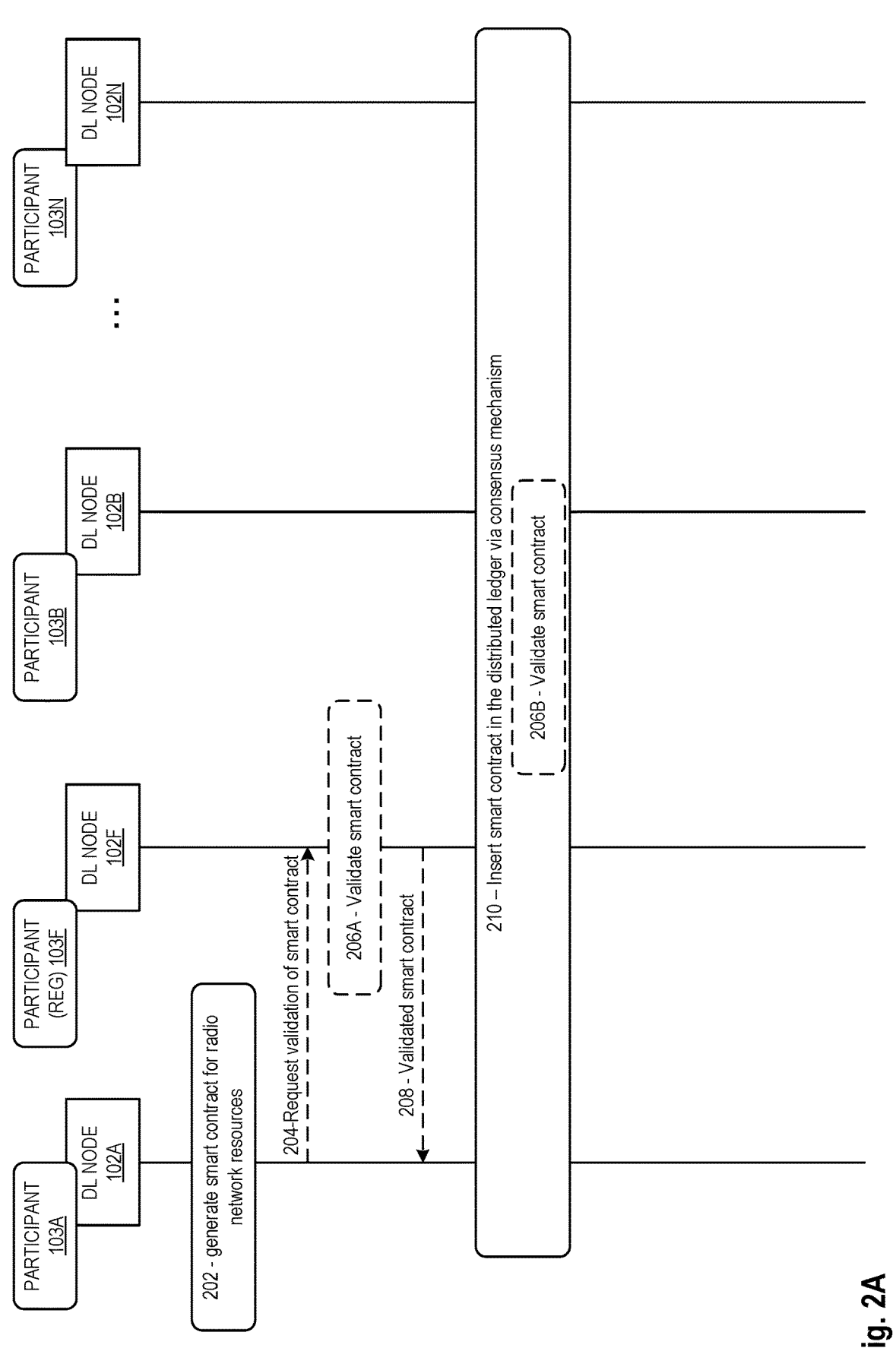
FIG. 2A illustrates a block diagram of exemplary operations that can be performed for inserting a smart contract for sharing radio network resources in a distributed ledger, in accordance with some embodiments.

FIG. 2A illustrates a block diagram of exemplary operations that can be performed for inserting a smart contract for sharing radio network resources in a distributed ledger, in accordance with some embodiments. At operation 202, a node of the participant 103A generates an ownership smart contact. A smart contract (which can also be referred to as a chaincode) is computer code that implements a computer protocol intended to digitally facilitate, verify, or enforce the negotiation or performance of a contract. A smart contract allows the execution of transactions between two participants without the intervention of a third party. Once executed, the transactions of a smart contract are stored in the digital ledger 110A and are trackable and irreversible. The ownership smart contract enables one or more participants that are different from participant 103A to obtain shares of the radio network resources of participant 103A and record the investment made in these radio network resources in the distributed ledger 110. The ownership smart contract is defined based on terms and conditions associated with the radio network resources. In some embodiments, the terms and conditions included in the smart contract may need to satisfy requirements set by a regulatory authority. The ownership smart contract generated by participant 103A can include a definition of the network resources. The definition of the network resource may include an identification of one or more cells and the configurations of the cells settings and parameters (e.g. number of sectors, bandwidth, bandwidth channels, spectrum range, radio access technology or technologies used), which may include baseband, radio units and antenna models, antenna heights, azimuth and tilt angles, etc., and identification of the geographical location(s) in which the radio access network is deployed. Additionally, capacity (maximum supported throughput, latency) and physical medium (e.g. microwave or fiber) of the backhaul/transport network. The network resources can be radio access network and/or transport network resources. When the network resources include the transport network, the definition of the network resources may include a description of one or more networks (including network devices and transport infrastructure) and their geographical location. The ownership smart contract can further include an investment amount needed for obtaining shares of the network resources. The investment amount may include capital expenses (CapEx) and/or operating expenses (OpEx). The ownership smart contract includes code that is capable of being executed to perform the following: 1) reserving shares in the radio network resources, and 2) transferring ownership of some or all of these shares to other participants. In some embodiments, ownership of the network resources can be enabled within a specific time frame. For example, the ownership of the network resources can be allocated for a limited period of time that has a start time and an end time, and which may span few months, years, or any other limited period of time. In other embodiments, the ownership of the network resources can be allocated without a limit in time.

In some embodiments, the ownership smart contract can be validated by a regulatory entity (e.g., the Federal Communication Commission in the Unites States of America). In one embodiment, the DL node 102A transmits, at operation 204, a request for validation of the ownership smart contract to a DL node 102F of the participant 103F. The participant 103F is a regulatory entity and its DL node 102F is operative to receive the validation request and validate the ownership smart contract at operation 206A. In some embodiments, the validation of the ownership smart contract (operation 206B) can be part of the insertion of the smart contract in the distributed ledger 110 via the consensus mechanisms that is performed at operation 210. In other embodiments, the validation of the ownership smart contract (operation 206A) can be performed independently of the insertion of the smart contract in the distributed ledger 110. Thus, while the embodiments herein describe a validation operation that is performed by the DL node 102F of a regulatory entity, in other embodiments, the validation is performed by multiple nodes of the DL network 100 in a collaborative mechanism. Validating the ownership smart contract may include determining whether the participant 103A is authorized to generate such a smart contract. For example, the REG may determine whether the participant 103A is licensed to deploy network resources in the geographical locations identified in the smart contract. In another example, the REG may determine that the spectrum bands that are to be used in the deployed network resources are licensed to the participant 103A and/or that they are unlicensed spectrum bands. The smart contract is inserted at operation 210 into the distributed ledger 110. The insertion is performed via a consensus mechanism (such as Proof of Work (PoW), Proof of Stake (PoS), or other) that is performed by multiple ones of the DL nodes of the DL network 100.

Figure 2B:
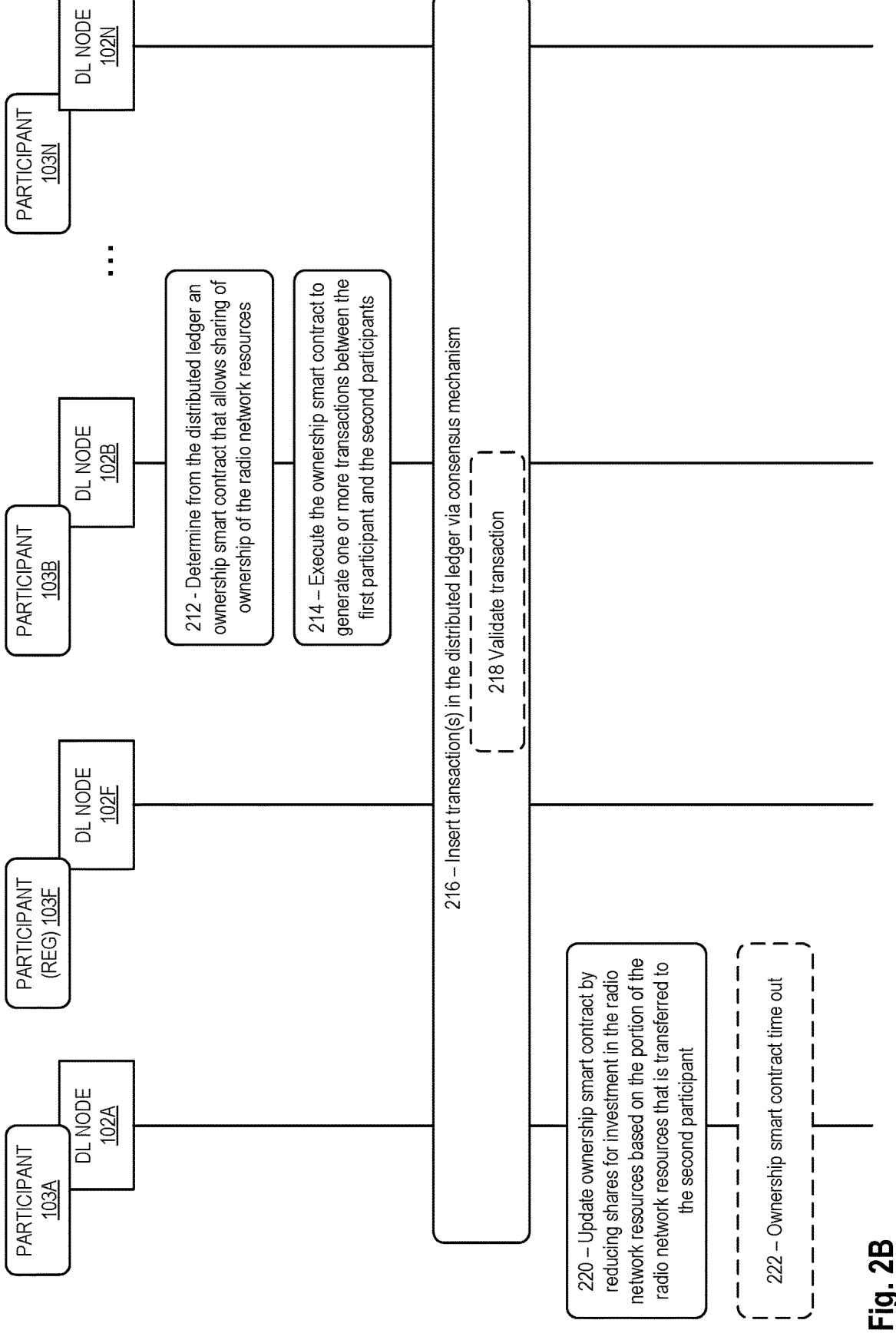
FIG. 2B illustrates a block diagram of exemplary operations that can be performed for sharing ownership of radio network resources, in accordance with some embodiments.

FIG. 2B illustrates a block diagram of exemplary operations that can be performed for sharing ownership of radio network resources, in accordance with some embodiments. When a participant, e.g., participant 103B, is interested to invest/share the infrastructure of a radio network that is owned by another participant, participant 103B uses the ownership smart contract to record an ownership transaction in the distributed ledger. The ownership transaction transfers ownership of a portion of the radio network resources from participant 103A to participant 103B. For example, participant 103B may determine, at operation 212, from the distributed ledger 110 an ownership smart contract that allows the sharing of radio network resources ownership. The smart contract is associated with a participant 103A that owns the radio network resources and is interested in sharing this ownership by offering up shares to other participants. The participant 103B executes the ownership smart contract, at operation 214. The execution of the ownership smart contract results in the generation of one or more transactions between the first participant 103A and the second participant 103B. The transactions may include a transaction for transferring ownership of a first portion of the radio network resources from the first participant 103A to the second participant 103B. The transactions may further include a transaction for transferring funds from the second participant 103B to the first participant 103A in exchange of ownership of the radio network resources. At operation 216, the transaction(s) are inserted in the distributed ledger 110 through a consensus mechanism. The insertion of the transaction in the distributed ledger includes validating, at operation 218, the transactions. For example, the validation may include the determination that the second participant 103B is authorized to own the radio network resources identified in the transaction. Other criteria can be used to validate the transactions. At operation 220, the ownership smart contract is updated by reducing the shares of the radio network resources that remain available for investment to other participant. In some embodiments, the second participant 103B invests in a portion of the radio network resources that is less than all of the available radio network resources of the participant 103A that are available for sharing. In these embodiments, a portion of the radio network resources remains available for ownership by other participants in the DL network 100. This portion of radio network resources is determined based on the portion of the radio network resources that is transferred to the second participant 103B. For example, when the first participant makes 50% of its radio network resources available to other participants and a second participant requests ownership of a portion of those 50% (e.g., 20% of the total radio network resources), 30% of radio network resources remain available to other participants of the DL network for sharing ownership of these radio network resources. In other embodiments, the second participant 103B invests by acquiring ownership of all the radio network resources that are available from the first participant 103A. Referring back to the same example where the first participant makes 50% of its radio network resources available for shared ownership to other participants of the DL network 100, if the second participant invests by acquiring all of these radio network resources, there will be no radio network resources available to other participants in the DL network 100. In some embodiments, updating the ownership smart contract can by a DL node 102A of the first participant. The update of the ownership smart contract may include inserting an updated version of the ownership smart contract in the distributed ledger 110 that renders the previous version of the ownership smart contract that was recorded in the distributed ledger 110 obsolete.

In some embodiments, the operations described with reference to FIG. 2B can be repeated for multiple ones of the participants in the DL network 100 allowing one or more participants to invest in the radio network resources originally owned by the first participant 103A. The operations can be repeated until the radio network resources that are available from the first participant for shared ownership are exhausted, i.e., ownership of these radio network resources have been transferred to one or more other ones of the participants or alternatively until a period of time has expired. In some embodiments, the radio network resources available for shared ownership can be made available to other participants of the DL network, through the generation of the ownership smart contract for a limited period of time. The limited period of time may be few months to few years after which these radio network resources are no longer available for shared ownership. To enable this feature, the ownership smart contract may include a self-destruct function that causes the smart contract to be no longer valid or be terminated after expiration of the period of time. When the smart contract is no longer valid (or is terminated), the ownership smart contract is no longer executable by the participants of the DL network to transfer ownership of radio network resources from one participant to another. For example, the smart contract may have an expiration date (e.g., a timestamp value) after which it is no longer valid.

In some embodiments, the radio network resources of which ownership is transferred from the first participant 103A to the second participant 103B include radio access network resources and transport network resources for coupling the radio access network with the core network. In other embodiments, the radio network resources of which ownership is transferred from the first participant 103A to the second participant 103B include radio access network resources only and do not include transport network resources. In these embodiments, the participant 103B may own transport network resources and/or perform a similar transfer of ownership mechanism for obtaining ownership of transport network resources from other participants in the DL network 100. In another embodiment, the radio network resources of which ownership is transferred from the first participant 103A to the second participant 103B include transport network resources only and do not include radio access network resources. In these embodiments, the participant 103B may own radio access network resources and/or perform a similar transfer of ownership mechanism for obtaining ownership of radio access network resources from other participants in the DL network 100.

In some embodiments, a participant 103B may transfer the newly acquired shared in the radio network resources to another participant at a later time. This can be performed through a new transaction executed with the ownership smart contract to transfer the shared of the participant 103B or a portion of those shares to another participant. The recordation of this transaction in the distributed ledger 110 is performed through the consensus mechanism.

Figure 1B:
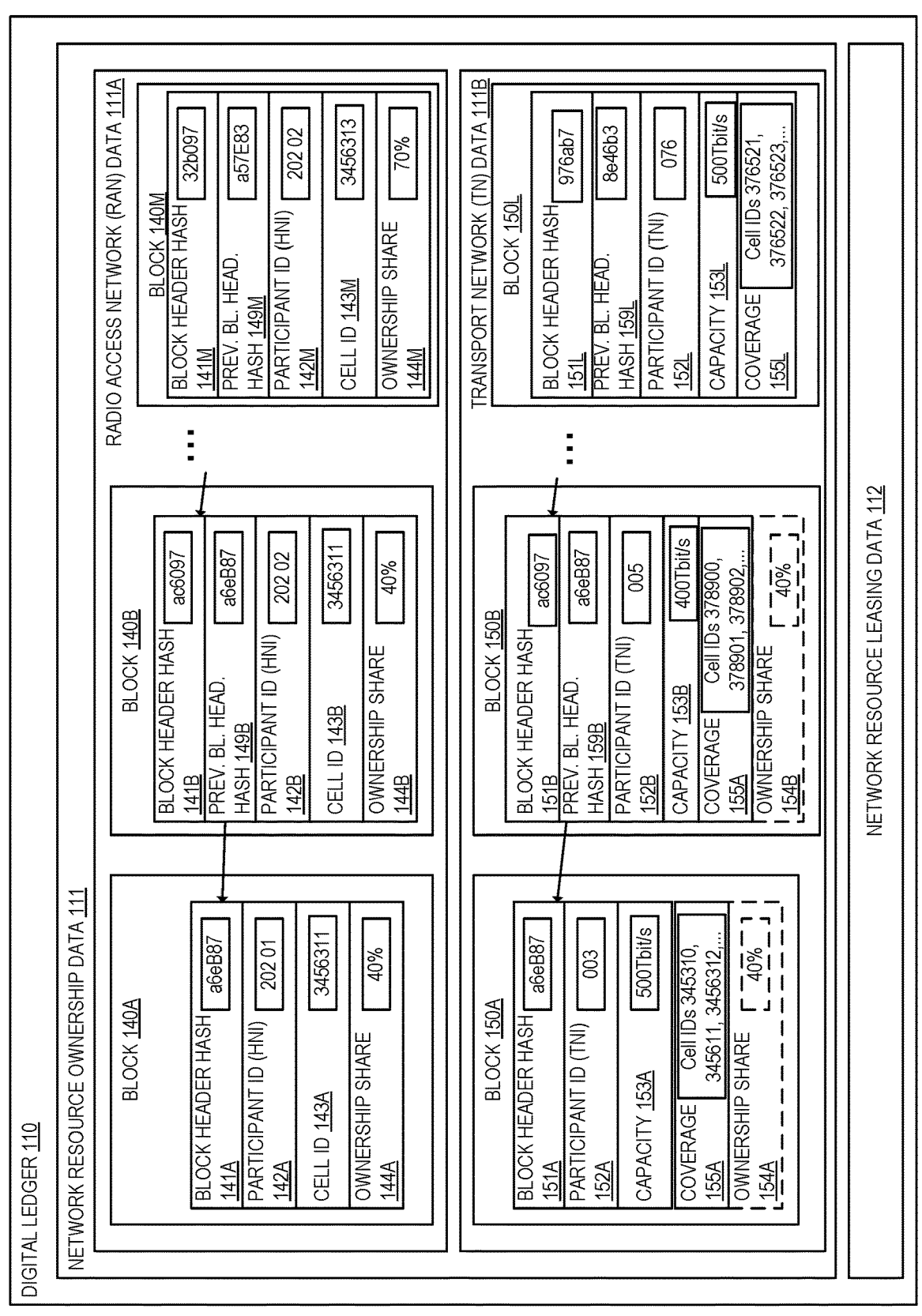
FIG. 1B illustrates a block diagram of an exemplary structure of the distributed ledger that includes network resource ownership data, in accordance with some embodiments.

FIG. 1B illustrates a block diagram of an exemplary structure of the distributed ledger 110 that includes network resource ownership data, in accordance with some embodiments. The radio network resource ownership data 111 is a layer of the distributed ledger 110 that contains information with regards to which participant owns which fraction or percentage of resources. The network resource ownership data result from the insertion of the transactions that transfers ownership of radio network resources to a participant of the DL network 100. The information may define the portion(s) of the radio access network resources and/or the transport network resources that is owned by which participant. For example, in the radio access network, the information may define the portion of cells/sites that are owned by a participant. In another example, for the transport network resources, the information may define the capacity of the transport network resources.

In some embodiments, the radio network resources ownership data 111 includes radio access network (RAN) data 111A and transport network (TN) data 111B. The RAN data 111 includes a set of blocks 140A-M. Each one of the blocks 140A-M includes a respective block header hash 141A-M, a respective participant ID 142A-M, a respective cell ID 143A-M, and a respective ownership share 144A-M. Blocks typically further include a previous block header hash, e.g., previous block header 149B that identifies the block that precedes the current block in the blockchain 140A-M. Block 140A does not include the previous block header hash as it does not have a previous block. Each one of the block headers 141A-M uniquely identifies the respective block in the blockchain. Each one of the participant IDs 142A-M is an identifier of the participant in the DL network 100 that owns the RAN resources identified in the respective block. In some embodiments, when the participant is a network operator, the participant ID can be a Home Network Identity—HNI number. In other embodiments, the participant ID can be allocated to the participant by the DL network 100 to uniquely identify this participant among other participants of the DL network 100 and this ID is different from the HNI. Each block further includes a respective cell ID 143A-M that uniquely identifies the cell of the radio access network that of which ownership is shared between multiple participants of the DL network 100. Each one of the cell IDs 143A-M can be used to retrieve additional details on the cell (e.g., geolocation, antenna type and configuration parameters, etc.). Each one of the blocks 140A-M further includes an ownership share that indicates the fraction or portion of the RAN resource identifies by the cell ID 143A-M that the respective one of the participants 143A-M owns.

The TN data 111B includes a set of blocks 150A-L. Each one of the blocks 150A-L includes a respective block header hash 151A-M, a respective participant ID 152A-L, a respective capacity 153A-L, a respective coverage 155A-L, and a respective ownership share 154A-L. Blocks typically further include a previous block header hash, e.g., previous block header 159B that identifies the block that precedes the current block in the blockchain 150A-L. Block 150A does not include the previous block header hash as it does not have a previous block. Each one of the block headers 151A-L uniquely identifies the respective block in the blockchain. Each one of the participant IDs 152A-L is an identifier of the participant in the DL network 100 that owns the TN resources identified in the respective block. In some embodiments, when the participant is not a network operator and HNI are used to identify the network operators in the DL network 100, the participant ID is assigned by the DL network 100 to not only be unique within the TN ecosystem but also distinct from HNIs that identify the network operators. Each block further includes a respective capacity 153A-L that indicates the capacity of the transport network identified in the block. Each one of the blocks further includes a coverage 155A-L that identifies the RAN resources that the identified transport network supports. For example, the coverage field 155A includes cell IDs of the multiple cells that the TN supports. Each one of the blocks 150A-L may further include an ownership share that indicates the fraction or portion of the RAN resource that the respective one of the participants 153A-L owns. In some embodiments, a participant, e.g., participant ID 152L, may own the entire shares of the TN resources and the ownership share field may not be present.

While FIG. 1B illustrates a set of blocks 140A-M in the distributed ledger 110 that record ownership of RAN cells and blocks 150A-L that records capacity of transport network for given RAN cells, the radio network resources ownership data 111 may further include transactions that transfer funds from a second participant to a first participant in exchange of shares in the radio network resources. While FIG. 1B illustrates a set of blocks 140A-M and 150A-L, in other embodiments, the DL network is not a blockchain network and other types of data structures can be used to record the ownership information for the radio network resources. While each block of the set of blocks in FIG. 1B shows a single ownership information (or single transaction), in other embodiments multiple ownership information or multiple transactions can be recorded in a single block. The blocks 140A-M and 150A-L are presented for illustrative purposes only and other information, data can be included in the network resource ownership data of the distributed ledger 110 without departing from the scope of the present embodiments.

Leasing of Radio Network Resources:

While the embodiments described above discussed sharing ownership of radio network resources (including RAN and/or TN), these resources are operated by a single participant. For example, while multiple network operator may own shares of a RAN that is deployed by a first network operator, the first network operator is the single participant that uses these RAN resources and may provide services to customers. However, the first network operator does not necessarily need the RAN resources all the time at full usage. The embodiments herein describe a mechanism that enables a participant to offer some or all of these resources for lease through the DL network 100. The offer to lease the radio network resources can be for a limited interval of time and is performed by adding lease information to the distributed ledger 110. Thus, the DL network 100 enables adaptive leasing of radio network resources.

In some embodiments, the use of the DL network 100 to enable dynamic and adaptive leasing of radio network resources can be performed independently from or in combination with the process of ownership sharing of these resources. For example, two separate DL networks can be used to support ownership sharing and adaptive leasing of radio network resources independently. A first DL network can be used to support ownership sharing and a second DL network can be used to support adaptive leasing of the radio network resources. In this embodiment, each DL network may have different sets of participants. Some participants can be common to both DL networks. Alternatively, a single DL network can be used to support both ownership sharing and adaptive leasing of the radio network resources. In another example, a single DL network can be used to support ownership sharing and adaptive leasing of radio network resources independently. Thus, in the description herein the DL nodes of the DL network 100 can be operative to perform some or all of the operations described herein with references to FIGS. 2A-D and 3A-B depending on whether they support ownership sharing, adaptive leasing, or a combination of both.

Figure 2C:
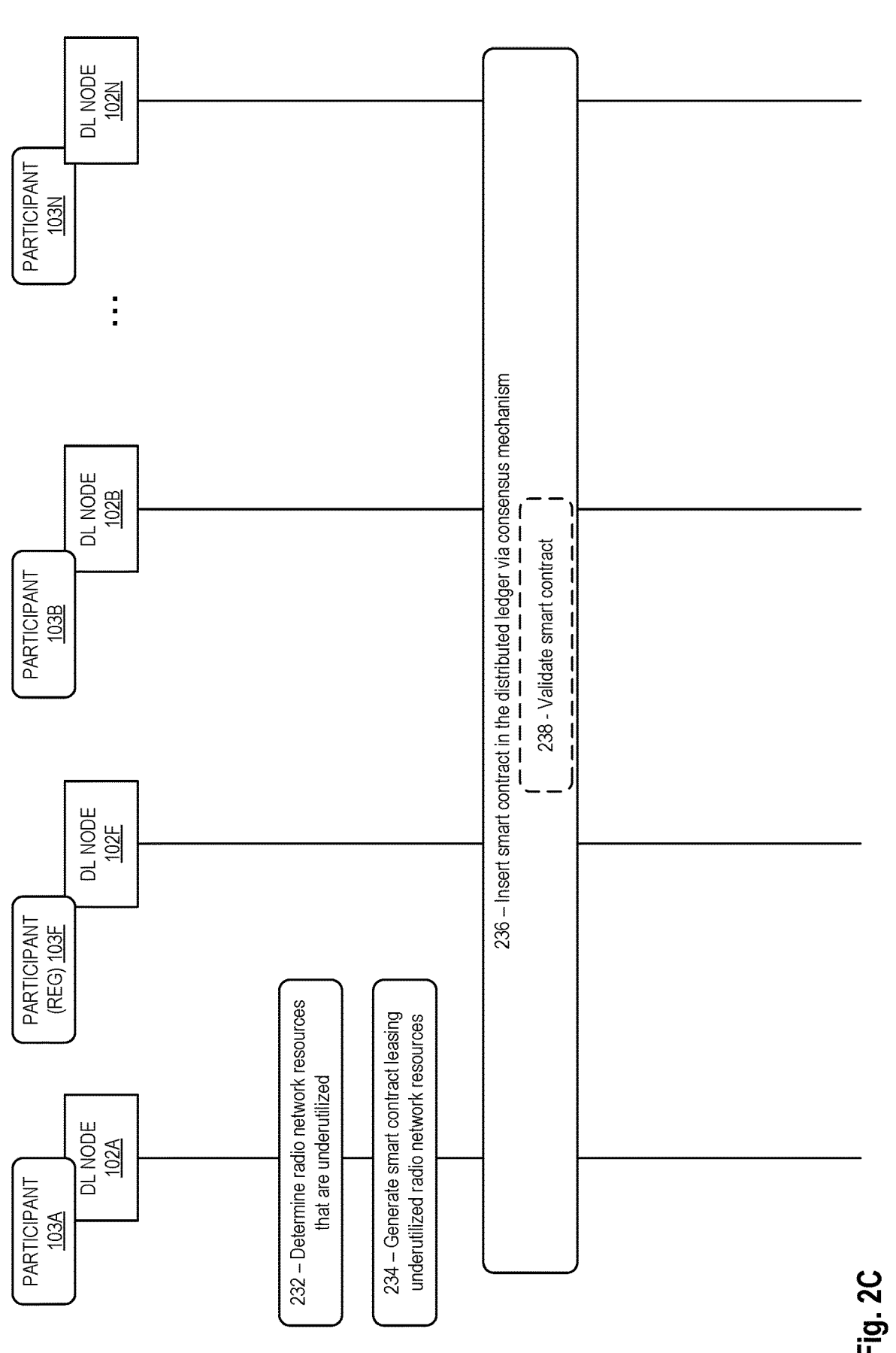
FIG. 2C illustrates a block diagram of exemplary operations for enabling adaptive leasing of radio network resources, in accordance with some embodiments.

FIG. 2C illustrates a block diagram of exemplary operations for enabling adaptive leasing of radio network resources, in accordance with some embodiments. At operation 232, a node of a participant 103A determines radio network resources that are underutilized. For example, the participant 103A may determine that RAN resources, such as a number of cells, located at a given geographical location are underutilized during certain time intervals (during the workday, in the evenings, on specific dates of the year, etc.). The determination of whether radio network resources are underutilized can be performed through multiple mechanisms. In some embodiments, the determination of underutilized radio network resources includes using radio base station counters, which are also known as eNB counters. The radio base station counters include several variables that measure performance. For example, the radio base station counters may measure the number of active UEs, the bandwidth utilization, etc. In some embodiments, a combination of the values of the radio base station counters and machine learning algorithms (e.g., pattern recognition) can indicate the time interval(s) during which a radio base station is underutilized. For example, the determination of underutilization of a radio base station may find that the base station does not handle a lot of traffic during weekends, or on special occasions such as public holidays. While operation 232 is described as being performed by a DL node of the participant 103A, in other embodiments, a processing node of the participant 103A can be used instead of the DL node 102A. The processing node does not need to support functionalities related to the DL network 100. Instead the processing node is only concerned with evaluating and measuring the performance and utilization of the radio network resources of the participant 103A. While the example herein describes radio access network resources, in other embodiments, a similar mechanism can be used to determine underutilization transport network resources.

At operation 234, the DL node 102A generates a smart contract for leasing the underutilized radio network resources. The smart contract enables the participant 103A to share the radio network resources that are determined to be underutilized. The underutilized radio network resources are offered for lease for a limited period of time. The smart contract includes radio network availability information. The smart contract may further include methods that enable another participant to lease through the DL network 100 the radio network resources according to the radio network availability information. In some embodiments, the radio network availability information includes one or more parameter values that identify the participant leasing the radio network resources, the radio network resources offered for lease, limited time period during which the radio network resources can be leased, and financial information associated with the radio network resources. In some embodiments, the availability information is defined as described in FIG. 1C.

At operation 236, the smart contract is inserted in the distributed ledger 1RAN resources according to a consensus mechanism performed between multiple DL nodes of the DL network 100. In some embodiments, the smart contract is inserted as part of a block, e.g., 160A, in a blockchain of the distributed ledger 110. In some embodiments, a smart contract for leasing radio network resources can be inserted in the distributed ledger when all other participants in the DL network 100 concede that the block is valid. In other embodiments, the smart contract for leasing radio network resources is interested in the distributed ledger 110 when a subset of the participants in the DL network 100 concede that the block is valid. In these embodiments, the subset of participants is less than all of the participants. In some embodiments, different participants may have different criteria for determining that the block is valid. For example, a REG may determine whether the radio network resource offered for lease (e.g., a RAN slice) is included in the list that the participant 103A owns. Additionally, REG may perform a location check between the radio network resource availability location and the location that the participant has invested or leased for radio network resources. This determination can be performed by a lookup of the radio network resource ownership data 111 stored in the digital ledger 110. In some embodiments, other participants in the DL network 100 can also check the availability block for further verification. Once the validation is completed, the smart contract for leasing the radio network resources is added to the distributed ledger as part of a block 160.

Several mechanisms can be used for enabling sharing of the radio network resources between participants. Monetary transactions, digital tokens or some form of barter system can be used for the exchange of available radio network resources between participants. In the scenario where digital tokens are used, each participant receives digital tokens for announcing and allowing other participant of the ledger to use its radio network resources. The earned digital tokens can then be used to lease radio network resources from other participant as needed.

FIG. 2D illustrates a block diagram of exemplary operations that can be performed for leasing radio network resources from a participant in the DL network, in accordance with some embodiments. At operation 242, the DL node 102B determines a need of radio network resources at a given geographical location. For example, a participant 103B may determine based on base station counters that the radio access network is used at a maximum capacity at a given geographical location and there is a need to support additional UEs and capacity at that location. In another example, the participant 103B may need to expand the geographical locations at which service is provided to users. While the examples herein describe radio access network resources, the determination of the need of radio network resources may also include a need for transport network resources. While operation 242 is described as being performed by a DL node, in other embodiments, the operation is performed by a processing node of the participant 103B that is not a DL node. When operation 242 is performed by another node, this other node is operative to transmit the detected need to the DL node 102B.

At operation 244, the DL node 102B determines from the distributed ledger one or more smart contracts indicating the radio network resources that are available for lease at the geographical location. In some embodiments, the determination of the available radio network resources is performed by looking up the radio network resources leasing data 112 of FIG. 1B. In some embodiments, the determination of the available radio network resources can be performed by looking-up the radio network resources leasing data 112 based on some criteria. The criteria include a geographical location and a time interval during which the resources are needed. In some embodiments, there may be several radio network resources available at the geographical location and for the desired time interval. In these embodiments, operation 246 can be performed by DL node 102B. At operation 246, the DL node 102B selects from the available radio network resources a first radio network resource. In some embodiments, the first radio network resource can be one of multiple radio network resources selected. The first radio network resource is owned by a first participant 103A and is offered for lease. For example, the DL node 102B may select a cell and a RAN slice. The DL node 102A executes a smart contract associated with the selected first radio network resource to generate one or more transactions between the first participant and the second participant. For example, a first transaction records the lease of the first radio network resource to the second participant for the limited period of time. In another example, a second transaction records monetary compensation or token compensation provided to the first participant in exchange of the lease of the first radio network resource. At operation 250, the transactions are inserted in the distributed ledger 110 through a consensus mechanism between multiple ones of the DL nodes of the DL network 100.

Figure 1C:
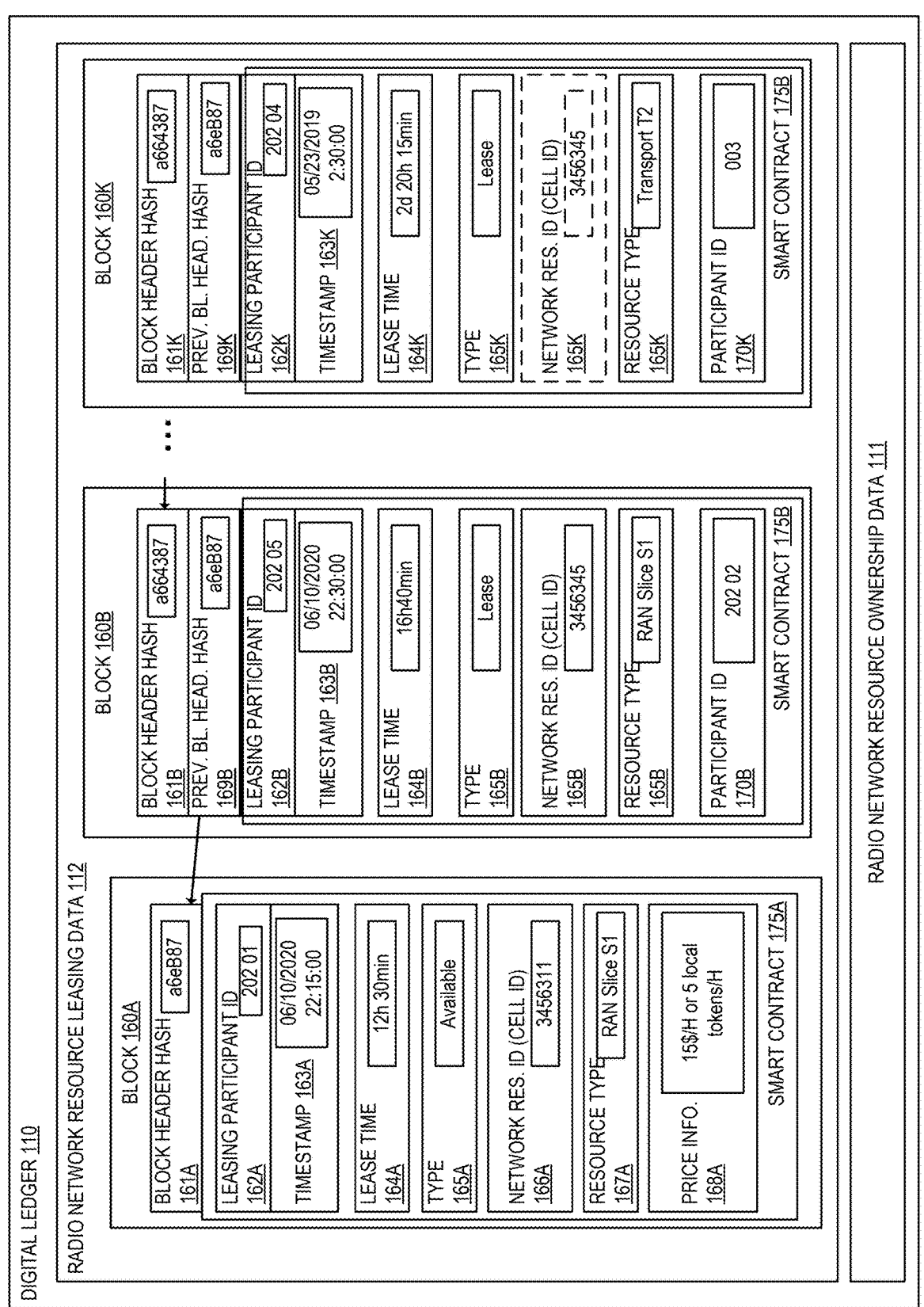
FIG. 1C illustrates a block diagram of an exemplary structure of the distributed ledger that includes network resource leasing data, in accordance with some embodiments.

FIG. 1C illustrates a block diagram of an exemplary structure of the distributed ledger 110 that includes network resource leasing data, in accordance with some embodiments. The network resource leasing data is a layer of the distributed ledger 110 that contains information with regards to which participant offers leases to radio network resources and which lease commitment have been recorded between participants.

The smart contract includes radio network availability information. The smart contract may further include methods that enable another participant to lease the radio network resources according to the radio network availability information. In some embodiments, the radio network availability information includes one or more parameter values that define the participant leasing the radio network resources, the radio network resources offered for lease, and any time and financial information associated with the radio network resources. In some embodiments, the availability information is defined as described in FIG. 1C.

In this layer, participants can "offer" parts of the RAN resources (including spectrum) that is under-utilized or not used at all for a subset or all of their cells/sites, by adding a block of type "Lease Availability" in the radio network resource leasing data 112. For example, block 160A is a block of type "lease availability." In some embodiments, the block includes a leasing participant ID 162A which identifies the participant that offers the radio network resources for lease, a timestamp 163A that indicates the time at which these resources start to be available to other participants, a type 165A which indicates the type of the block (lease availability or lease), a network resource ID which identifies the radio network resource that are offered for lease (e.g., cells/sites), a resource type 167A which indicate different types/categories of well-defined RAN slices based on the QoS parameters, radio resources, etc., may also contain the potential duration of the lease, as well as pricing information 168A. In some embodiments, if there are some specific requirements (not known to other participants) from regulatory authority or network vendor entity for the slice available for lease these requirements can also be included in the blocks of the radio network resource leasing data 112. The radio network resource leasing data 112 further includes a second type of blocks, e.g., block 160B. The second block is of type "Lease Commitment" and is indicative of a lease commitment from a first participant to a second participant to lease the radio network resources. In addition to the fields included in the "lease availability" block, the lease commitment block may further include a participant ID 170B that identifies the participant that is leasing the radio network resources from the leasing participant.

While the blocks 160A-K illustrate a single lease included in each block, in other embodiments, multiple offerings and/or lease commitments can be recorded in the same block. For example, there can be multiple time periods when different parts of spectrum are available (i.e., a list of <timestamp, spectrum range> records) and recorded in the same availability block. Similarly, there can be multiple time periods for reserving the spectrum resources of a participant in the lease commitment block.

While FIG. 1C illustrates a set of blocks 160A-K, in other embodiments, the DL network is not a blockchain network and other types of data structures can be used to record the ownership information for the radio network resources. While each block of the set of blocks in FIG. 1C shows a single ownership information (or single transaction), in other embodiments multiple ownership information or multiple transactions can be recorded in a single block.

The embodiments described herein enable a dynamic and adaptive sharing of radio network resources. The operations of FIGS. 2C-D are repeated periodically such that each participant of the DL network 100 that owns network resources can update the radio network resources that are available for lease on a continuous basis. The update of the availability of the radio network resources adapts according to the usage of these resources by UEs of the participants. The dynamic update of the availability of the resources enable other participants of the DL network 100 to lease radio network resources without the need of deploying their own resources. The embodiments described herein present a collaborative and trusted platform that allows mobile network operators to invest and/or use radio network resources including RAN resources dynamically based on spatio-temporal demand. This collaborative platform leads to a reduction in the total cost of new services to end-users while maintaining the same levels of QoE. The immutability and replicability of the distributed ledger that stores the radio network availability information and the committed leases enables the establishment of audit trails and detection of potential violation of contracts among co-owners and/or the tenants of the radio network resources. Further, in addition to enabling radio access network sharing, the proposed system and method enable the transport resource sharing.
Sharing Radio Network Resources:

The operations in the flow diagrams of FIGS. 3A-B will be described with reference to the exemplary embodiments of FIGS. 1A-2D. However, it should be understood that the operations of the flow diagrams of FIGS. 3A-B can be performed by embodiments of the invention other than those discussed with reference to FIGS. 1A-2D, and the embodiments of the invention discussed with reference to FIGS. 1A-2C can perform operations different than those discussed with reference to the flow diagrams of FIGS. 3A-B. While the embodiments herein are described with respect to a participant 103A and another participant 103B, one of ordinary skill in the art would understand that these participants are used for illustrative purposes. The operations described herein can be performed for multiple participants in the DL network 100 and enable sharing of radio network resources (ownership and leasing) between different pairs of these multiple participants. For example, a single participant may share ownership of different portions of their radio network resources with different ones of the participants. In another example, the participant can be lease radio network resources to different ones of the participants. For example, the participant can lease the same radio network resources to different ones of the participant over different intervals of times. Alternatively or additionally, the participant can lease different radio network resources to the same or different ones of the participants over multiple interval of times.

Figure 3A:
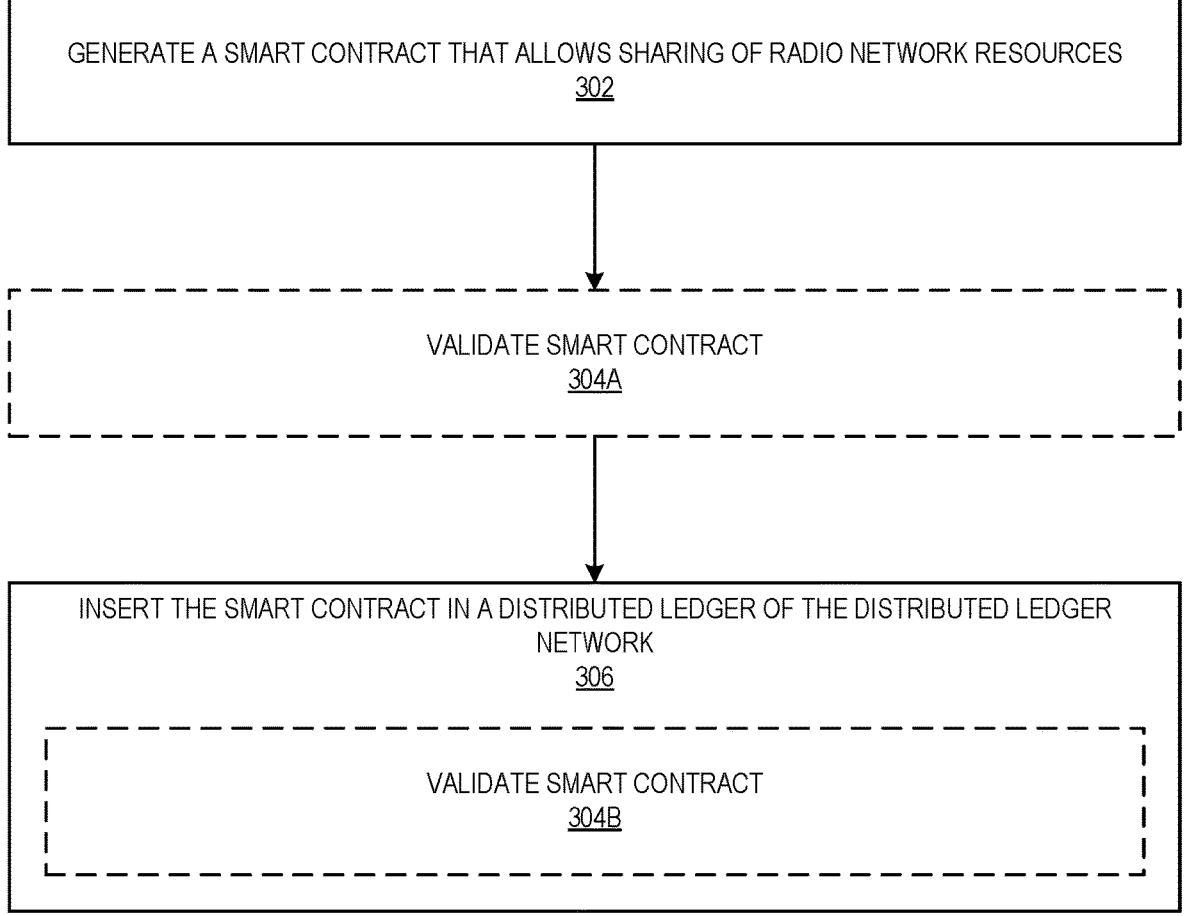
FIG. 3A illustrates a flow diagram of exemplary operations that can be performed for inserting a smart contract that allows sharing of radio network resources in a distributed ledger, in accordance with some embodiments.

FIG. 3A illustrates a flow diagram of exemplary operations that can be performed for inserting a smart contract that allows sharing of radio network resources in a distributed ledger, in accordance with some embodiments. As described above, the radio network resources can be radio access network resources and/or transport network resources. At operation 302, a DL node of a first participant, e.g., participant 103A, generates a smart contact for the radio network resource of the first participant. In some embodiments, the smart contract can be an ownership smart contract. The ownership smart contract allows the first participant to enable other participants in the DL network 100 to share ownership of the radio network resources. In other embodiments, the smart contract can be a lease smart contract. The lease smart contract allows the first participant to enable other participants in the DL network 100 to lease radio network resources from the first participant.

In some embodiments, the smart contract is validated. In some embodiments, the validation is performed by a regulatory entity (e.g., the Federal Communication Commission in the Unites States of America). In one embodiment, the DL node 102A transmits a request for validation of the smart contract to a DL node 102F of the participant 103F. The participant 103F is a regulatory entity and its DL node 102F is operative to receive the validation request and validate at operation 306 the smart contract. Validating the smart contract may include determining whether the participant 103A is authorized to generate such a smart contract. For example, the REG may determine whether the participant 103A is licensed to deploy network resources in the geographical locations identified in the smart contract. In another example, the REG may determine that the spectrum bands that are to be used in the deployed network resources are licensed to the participant 103A and/or that they are unlicensed spectrum bands. In a further example, the validation may include determining that the first participant owns the radio access resources that are to be leased. In some embodiments, the validation of the smart contract (operation 304B) can be part of the insertion of the smart contract in the distributed ledger 110 that is performed at operation 306. In other embodiments, the validation of the smart contract can be performed independently of the insertion of the smart contract in the distributed ledger 110 (operation 304A). While the embodiments herein describe a validation operation that is performed by the DL node 102F of a regulatory entity, in other embodiments, the validation is performed by multiple nodes of the DL network 100 in a collaborative manner through a consensus mechanism.

The flow of operation moves to operation 306, at which the smart contract is inserted into the distributed ledger 110. The insertion is performed via a consensus mechanism (such as Proof of Work (PoW), Proof of Stake (PoS), or other) that is performed by multiple ones of the DL nodes of the DL network 100.

FIG. 3B illustrates a flow diagram of exemplary operations that can be performed for sharing radio network resources from a participant to another participant, in accordance with some embodiments. In some embodiments, the operations of FIG. 3B can be performed for transferring ownership of radio network resources from a first participant 103A to a second participant as described in further detail with respect to FIGS. 2A-B. In other embodiments the operations of FIG. 3B can be performed for enabling the second participant 103B to lease radio network resources from the first participant 103A.

At operation 312, a DL node 102B of the second participant 103B determines from a distributed ledger 110 of the distributed ledger network 100 a smart contract that allows sharing of radio network resources. The radio network resources are owned by the first participant 103A.

The flow of operations moves to operation 314, at which the smart contract is executed to generate one or more transactions between the first participant and the second participant. The transactions include a first transaction that indicates that a first portion of the radio network resources of the first participant 103A is shared with the second participant 103B. For example, the first transaction may indicate a transfer of ownership of the first portion of the radio network resources from the first participant to the second participant. In another example, the first transaction may indicate a lease commitment between the first participant and the second participant for using the first portion of the radio network resources during a predetermined period of time. The transactions further include a second transaction that transfers (318) funds from the second participant 103B to the first participant 103A. The funds are transferred from the second participant to the second participant in exchange of the first portion of the radio network resources being shared with the second participant (103B). The flow of operation moves to operation 316, at which the transactions are recorded, through a consensus mechanism, in the distributed ledger 110.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the disclosure may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of DL network 100 can be implemented on one or more network devices coupled through a physical network.

FIG. 4 illustrates a block diagram for a network device that can be used for implementing one or more of the DL nodes described herein, in accordance with some embodiments. According to one embodiment, the network device is an electronic device which includes hardware 405. Hardware 405 includes one or more processors 414, network communication interfaces 460 coupled with a computer readable storage medium 412. The computer readable storage medium 412 may include a computer program 411.

While one embodiment does not implement virtualization, alternative embodiments may use different forms of virtualization—represented by a virtualization layer 420. In these embodiments, the instance 440 and the hardware that executes it form a virtual server which is a software instance of the modules stored on the computer readable storage medium 412.

The computer program 411 includes instructions which when executed by the hardware 405 causes the DL node instance 440 to perform the operations described with reference to FIGS. 1A-3B. In this embodiment, each one of the DL nodes used by a participant in the DL network 100 is implemented on a single network device.

FIG. 5 illustrates an exemplary embodiment in which a node is implemented over multiple network devices. In the illustrated example, the DL node 502 is distributed over multiple network devices 530A-530K, where each network device has a similar architecture as network device 430. The multiple network devices 530A-530K are coupled through one or more links and can be located in a same geographical location or remote from one another. The operations described with reference to the embodiments of FIGS. 1A-3B can be distributed over the multiple network devices, such as each network device is operative to perform a subset of the operations described herein. In some embodiments, each one of the DL nodes used by participants in the DL network 100 can be implemented as the DL node 502.

Figure 6:
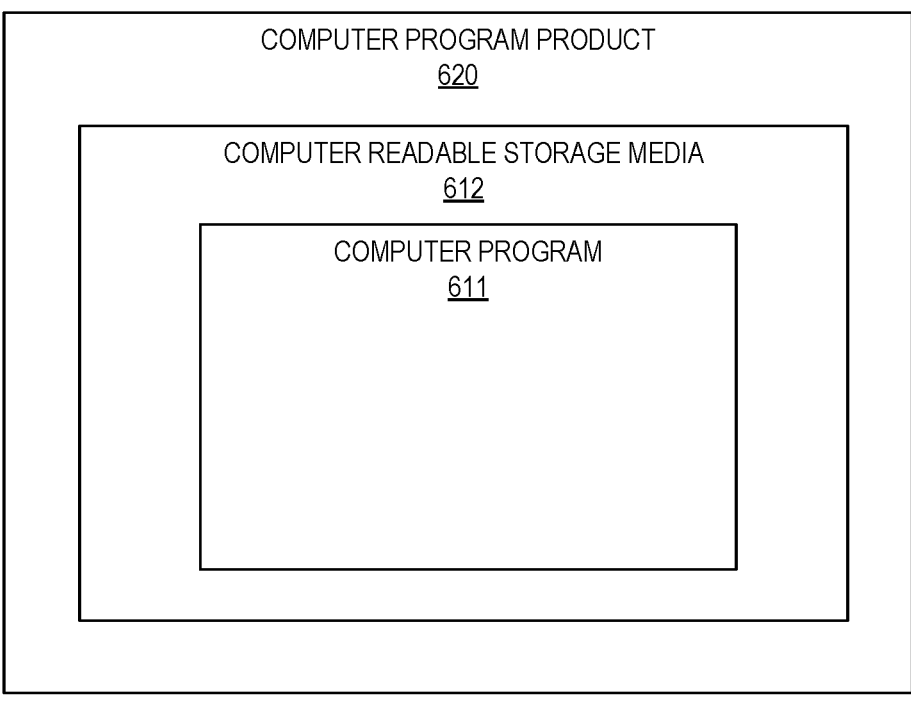
FIG. 6 illustrates a block diagram for a computer program product that can be used for deployment of services for customers in accordance with some embodiments.

FIG. 6 illustrates a block diagram for a computer program product that can be used for deployment of services for customers in accordance with some embodiments. FIG. 6 illustrates a computer program product 620, which includes computer readable storage media 612 that includes a computer program 611, which when executed by one or more processors performs operations that may comprise the operations of FIGS. 2A-D, or the operations of FIGS. 3A-B. The computer program can be contained in a carrier, where the carrier is one of an electronic signal, optical signal, radio signal, or computer readable storage medium.

While the flow diagrams in the figures show a particular order of operations performed by certain embodiments of the disclosure, it should be understood that such order is exemplary (e.g., alternative embodiments may perform the operations in a different order, combine certain operations, overlap certain operations, etc.).

While the disclosure has been described in terms of several embodiments, those skilled in the art will recognize that the disclosure is not limited to the embodiments described, can be practiced with modification and alteration within the spirit and scope of the appended claims. The description is thus to be regarded as illustrative instead of limiting.

The invention claimed is:

1. A method for sharing radio network resources in a distributed ledger (DL) network that is operated between a plurality of participants including a first participant who is a mobile network operator, who is an owner of a radio access network (RAN) infrastructure that includes base stations or other access points, and a second participant who is a different mobile network operator, who is a vendor leasing usage of RAN resources of the RAN infrastructure, the method performed by a DL node of the second participant comprising:

determining, at the DL node of the second participant, from a DL of the DL network a smart contract that allows sharing of the RAN resources of the RAN infrastructure owned by the first participant, wherein the DL contains a lease availability information comprising:

leasing participant identity (ID) identifying the first participant, timestamp indicating a time at which the RAN resources are available, type of lease, resource ID identifying a resource available for lease, and resource type identifying type of resource;

executing the smart contract to generate one or more transactions between the first participant and the second participant, wherein a first transaction of the one or more transactions indicates that a first portion of the RAN resources of the first participant is leased to the second participant; and recording, through a consensus mechanism, the first transaction in the DL.

2. The method of claim 1, wherein a second transaction of the one or more transactions indicates a transfer of funds from the second participant to the first participant in exchange of the first portion of the RAN resources being leased to the second participant.

3. The method of claim 1, wherein leasing of the first portion of the RAN resources to the second participant includes sharing the first portion of the RAN resources between the first participant and the second participant.

4. The method of claim 1, wherein the determining, at the DL node of the second participant, from the DL of the DL network the smart contract that allows sharing of the RAN resources owned by the first participant includes:

determining, from the DL, one or more smart contracts indicating RAN resources that are available for lease; and selecting the smart contract from the one or more smart contracts.

5. The method of claim 4, wherein the first transaction indicates a lease commitment between the first participant and the second participant for using the first portion of the RAN resources during a predetermined period of time.

6. The method of claim 1, wherein resources to be shared include transport network resources.

7. A non-transitory computer-readable storage medium comprising instructions which, when executed by at least one processor of a distributed ledger (DL) node, cause the DL node to perform operations for sharing radio network resources in a DL network that is operated between a plurality of participants including a first participant who is a mobile network operator, who is an owner of a radio access network (RAN) infrastructure that includes base stations or other access points, and a second participant who is a different mobile network operator, who is a vendor leasing usage of RAN resources of the RAN infrastructure, comprising:

determining, at the DL node associated with the second participant, from a DL of the DL network a smart contract that allows sharing of the RAN resources of the RAN infrastructure owned by the first participant, wherein the DL contains a lease availability information comprising:

leasing participant identity (ID) identifying the first participant, timestamp indicating a time at which the RAN resources are available, type of lease, resource ID identifying a resource available for lease, and resource type identifying type of resource;

executing the smart contract to generate one or more transactions between the first participant and the second participant, wherein a first transaction of the one or more transactions indicates that a first portion of the RAN resources of the first participant is leased to the second participant; and recording, through a consensus mechanism, the first transaction in the DL.

8. A distributed ledger (DL) node for sharing radio network resources in a DL network that is operated between a plurality of participants including a first participant who is a mobile network operator, who is an owner of a radio access network (RAN) infrastructure that includes base stations or other access points, and a second participant who is a different mobile network operator, who is a vendor leasing usage of RAN resources of the RAN infrastructure, the DL node associated with the second participant comprising:

one or more processors; and a computer readable storage medium storing a set of computer readable instructions that, when executed by the one or more processors, cause the DL node of the second participant to perform operations to:

determine from a DL of the DL network a smart contract that allows sharing of the RAN resources of the RAN infrastructure owned by the first participant, wherein the DL contains a lease availability information comprising:

leasing participant identity (ID) identifying the first participant, timestamp indicating a time at which the RAN resources are available, type of lease, resource ID identifying a resource available for lease, and resource type identifying type of resource;

execute the smart contract to generate one or more transactions between the first participant and the second participant, wherein a first transaction of the one or more transactions indicates that a first portion of the RAN resources of the first participant is leased to the second participant; and record, through a consensus mechanism, the first transaction in the DL.

9. The DL node of claim 8, wherein a second transaction of the one or more transactions indicates a transfer of funds from the second participant to the first participant in exchange of the first portion of the RAN resources being leased to the second participant.

10. The DL node of claim 8, wherein leasing of the first portion of the RAN resources to the second participant includes sharing the first portion of the RAN resources between the first participant and the second participant.

11. The DL node of claim 8, wherein to determine, at the DL node of the second participant, from the DL of the DL network the smart contract that allows sharing of the RAN resources owned by the first participant further to:

determine, from the DL, one or more smart contracts indicating RAN resources that are available for lease; and select the smart contract from the one or more smart contracts.

12. The DL node of claim 11, wherein the first transaction indicates a lease commitment between the first participant and the second participant for using the first portion of the RAN resources during a predetermined period of time.

\* \* \* \* \*